US010419291B2

(12) United States Patent
Yang et al.

(10) Patent No.: US 10,419,291 B2
(45) Date of Patent: Sep. 17, 2019

(54) TERMINAL UPGRADE METHOD AND RELATED DEVICE WITH MULTICAST PROGRAM

(71) Applicant: Huawei Technologies Co., Ltd., Shenzhen (CN)

(72) Inventors: Shenlong Yang, Shenzhen (CN); Bo Du, Wuhan (CN); Xiaoya Zheng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 15/328,417

(22) PCT Filed: Jul. 23, 2014

(86) PCT No.: PCT/CN2014/082779
§ 371 (c)(1),
(2) Date: Jan. 23, 2017

(87) PCT Pub. No.: WO2016/011607
PCT Pub. Date: Jan. 28, 2016

(65) Prior Publication Data
US 2017/0214568 A1 Jul. 27, 2017

(51) Int. Cl.
*G06F 9/44* (2018.01)
*H04L 12/24* (2006.01)
(Continued)

(52) U.S. Cl.
CPC ............. *H04L 41/082* (2013.01); *G06F 8/65* (2013.01); *H04L 1/0061* (2013.01);
(Continued)

(58) Field of Classification Search
CPC .................................................. H04L 41/082
(Continued)

(56) References Cited

U.S. PATENT DOCUMENTS 6,009,274 A * 12/1999 Fletcher .................... G06F 8/65
709/217
6,721,612 B2 * 4/2004 Aramaki .................. G06F 8/60
700/4

(Continued)

FOREIGN PATENT DOCUMENTS

| CN | 101217412 A | 7/2008 |
| CN | 101355454 A | 1/2009 |

(Continued)

OTHER PUBLICATIONS

Cadar et al, "Multi-version Software Updates", IEEE, pp. 36-40, 2012 (Year: 2012).*

(Continued)

*Primary Examiner* — Anil Khatri
(74) *Attorney, Agent, or Firm* — Leydig, Voit & Mayer, Ltd.

(57) ABSTRACT

A terminal upgrade method and a related device are provided. The method includes: encapsulating, by an element management system (EMS), an upgrade version file supported by a type of terminal as a multicast program and storing the multicast program in a multicast server, or sending an upgrade version file supported by a type of terminal to a multicast server; establishing, by the EMS, a version-address mapping relationship; delivering, by the EMS, the version-address mapping relationship to a terminal; and delivering an upgrade start instruction to the terminal, to trigger the terminal to send a multicast program on-demand request to the multicast server, so that the terminal receives the multicast program that is stored in the multicast program storage address of the terminal and sent by the multicast server, and the terminal performs a version upgrade operation according to the received multicast program.

12 Claims, 11 Drawing Sheets

(51) Int. Cl.
*G06F 8/65* (2018.01)
*H04L 1/00* (2006.01)
*H04L 29/08* (2006.01)
*H04Q 11/00* (2006.01)
*H04L 29/06* (2006.01)

(52) U.S. Cl.
CPC .......... *H04L 41/0809* (2013.01); *H04L 67/34* (2013.01); *H04Q 11/0062* (2013.01); *H04L 41/0856* (2013.01); *H04L 69/22* (2013.01); *H04L 2212/00* (2013.01); *H04Q 2011/0047* (2013.01); *H04Q 2011/0083* (2013.01)

(58) Field of Classification Search
USPC .................................. 717/168–176; 709/203
See application file for complete search history.

(56) References Cited

U.S. PATENT DOCUMENTS

| | | | | |
|---|---|---|---|---|
| 7,219,344 B2* | 5/2007 | Chenelle | .................. | G06F 8/61 717/168 |
| 7,308,491 B2* | 12/2007 | Gosewehr | ............. | H04W 24/00 709/221 |
| 7,526,762 B1* | 4/2009 | Astala | ....................... | G06F 8/33 709/203 |
| 7,720,903 B1* | 5/2010 | Huckins | .................. | H04L 12/18 709/200 |
| 7,844,721 B2* | 11/2010 | Lee | ........................... | G06F 8/65 709/230 |
| 8,407,682 B2* | 3/2013 | Reisman | ................... | G06F 8/65 717/168 |
| 8,484,318 B2* | 7/2013 | Zhang | ................. | H04L 12/1895 370/229 |
| 8,510,384 B2* | 8/2013 | Yamauchi | ........... | H04L 12/1836 709/205 |
| 8,752,116 B2* | 6/2014 | Heo | ....................... | H04N 7/165 725/132 |
| 9,270,529 B2* | 2/2016 | Jacob | .................. | H04L 41/0866 |
| 9,596,305 B2* | 3/2017 | Chauhan | ............. | H04L 67/1097 |
| 9,609,003 B1* | 3/2017 | Chmielewski | ........ | G06F 16/954 |
| 9,621,668 B2* | 4/2017 | Kamath | .............. | H04L 67/2842 |
| 9,904,535 B2* | 2/2018 | Gross | ..................... | G01R 31/44 |
| 10,122,872 B1* | 11/2018 | Shin | .................. | H04N 1/00344 |
| 10,243,651 B1* | 3/2019 | Le | ....................... | H04B 7/18528 |
| 2011/0185044 A1 | 7/2011 | Zhang et al. | | |
| 2015/0033217 A1* | 1/2015 | Mellor | .................. | H04L 63/102 717/171 |

FOREIGN PATENT DOCUMENTS

| | | |
|---|---|---|
| CN | 101877650 A | 11/2010 |
| CN | 102098590 A | 6/2011 |
| CN | 102118260 A | 7/2011 |
| CN | 103209362 A | 7/2013 |
| EP | 2326047 A1 | 5/2011 |

OTHER PUBLICATIONS

Cook et al, "Highly Reliable Upgrading of Components", ACM, pp. 203-212, 1999 (Year: 1999).*

Curino et al, "Automating Database Schema Evolution in Information System Upgrades", ACM, pp. 1-5 (Year: 2009).*

Mikkonen et al, "Elements for a Cloud-Based Development Environment: Online Collaboration, Revision Control, and Continuous Integration", ACM, pp. 14-20 (Year: 2012).*

Dumitras, "Dependable, Online Upgrades in Enterprise Systems", ACM, pp. 743-744 (Year: 2009).*

Bing-zhang et al, "XML Configuration-based Self-adaptive Database Connection Pooling in NMVS", IEEE, pp. 130-133 (Year: 2009).*

* cited by examiner

TERMINAL UPGRADE METHOD AND RELATED DEVICE WITH MULTICAST PROGRAM

CROSS-REFERENCE TO RELATED APPLICATIONS

This application is a National Stage of International Application No. PCT/CN2014/082779, filed on Jul. 23, 2014, which is hereby incorporated by reference in its entirety.

TECHNICAL FIELD

The present invention relates to the field of optical network technologies, and in particular, to a terminal upgrade method and a related device.

BACKGROUND

In a passive optical network (Passive Optical Network, PON), functions of an optical network terminal (Optical network terminal, ONT) managed by an optical line terminal (Optical Line Terminal, OLT) need to be continuously enhanced with large-scale commercial use of fiber to the home (Fiber To The Home, FTTH). Therefore, a version upgrade operation needs to be constantly performed on the ONT managed by the OLT.

In practice, a process of performing an upgrade operation on an ONT can be summarized as follows: An element management system (Element Management System, EMS) receives version numbers of various types of ONTs reported via an OLT, and compares the version numbers reported by the various types of ONTs with version numbers of various types of ONTs saved on the EMS, and determines various types of to-be-upgraded ONTs according to comparison results. The OLT performs a version upgrade operation on the various types of to-be-upgraded ONTs in sequence. That is, for each type of to-be-upgraded ONT, the OLT determines whether it is the first time to perform an upgrade operation on this type of ONT. If it is the first time to perform an upgrade operation on this type of ONT, the OLT may acquire, from the EMS, an upgrade version file for this type of ONT, and deliver the upgrade version file to this type of ONT, so that this type of ONT performs a version upgrade operation. Alternatively, if it is not the first time to perform an upgrade operation on this type of ONT, an upgrade version file for this type of ONT is already saved in a flash of the OLT, and the OLT may directly extract the upgrade version file for this type of ONT from the flash and deliver the upgrade version file to this type of ONT, so that this type of ONT performs a version upgrade operation.

It is discovered in practice that, in the foregoing process of performing an upgrade operation on various types of ONTs, the upgrade operation performed on the various types of ONTs is controlled by an OLT, and when there is a relatively large quantity of various types of to-be-upgraded ONTs, a workload of the OLT is increased, thereby affecting performance of OLT services, such as service provisioning, user status monitoring, and user bandwidth allocation. In addition, in the foregoing process of performing an upgrade operation on various types of ONTs, the OLT performs an upgrade operation on various types of to-be-upgraded ONTs in a serial processing manner, which generally results in a very long time for upgrading the various types of to-be-upgraded ONTs, thereby affecting ONT upgrade efficiency.

SUMMARY

Embodiments of the present invention disclose a terminal upgrade method and a related device, which can effectively reduce a workload of an OLT and improve terminal upgrade efficiency.

A first aspect of the embodiments of the present invention discloses a terminal upgrade method, including encapsulating, by an element management system EMS, an upgrade version file supported by a type of terminal as a multicast program, and storing the multicast program in a multicast server; or sending, by an element management system EMS, an upgrade version file supported by a type of terminal to a multicast server, so that the multicast server encapsulates the upgrade version file as a multicast program, establishing, by the EMS, a version-address mapping relationship, where the version-address mapping relationship includes a mapping relationship between an upgrade version number and a multicast program storage address, delivering, by the EMS, the version-address mapping relationship to a terminal, and delivering, by the EMS, an upgrade start instruction to the terminal, to trigger the terminal to send a multicast program on-demand request to the multicast server according to the multicast program storage address in the version-address mapping relationship, so that the terminal receives the multicast program that is stored in the multicast program storage address of the terminal and sent by the multicast server, and the terminal performs a version upgrade operation according to the received multicast program.

In a first possible implementation manner of the first aspect of the embodiments of the present invention, the encapsulating an upgrade version file supported by a type of terminal as a multicast program includes dividing the upgrade version file supported by the type of terminal into at least one upgrade version sub-file, allocating a control header to the upgrade version sub-file, where the control header includes information required for upgrading the terminal, and combining the upgrade version sub-file to obtain the multicast program of the upgrade version file.

With reference to the first aspect of the embodiments of the present invention or the first possible implementation manner of the first aspect of the embodiments of the present invention, in a second possible implementation manner of the first aspect of the embodiments of the present invention, the delivering, by the EMS, the version-address mapping relationship to a terminal includes loading, by the EMS, the version-address mapping relationship into an XML configuration file, to obtain a target XML configuration file, and delivering, by the EMS, the target XML configuration file to the terminal.

With reference to the second possible implementation manner of the first aspect of the embodiments of the present invention, in a third possible implementation manner of the first aspect of the embodiments of the present invention, after the delivering, by the EMS, the target XML configuration file to the terminal and before the delivering, by the EMS, an upgrade start instruction to the terminal, the method further includes delivering, by the EMS, an upgrade test instruction to the terminal, where the upgrade test instruction includes an upgrade check parameter, and the upgrade check parameter includes at least a current version number and an upgrade version number that are supported by the type of terminal, receiving, by the EMS, a check result, reported by the terminal, of checking the upgrade check parameter by the terminal, and determining, by the EMS, whether the check result is that the upgrade check parameter passes the check, and if the upgrade check parameter passes the check, performing the step of delivering an upgrade start instruction to the terminal.

A second aspect of the embodiments of the present invention discloses a terminal upgrade method, including receiving, by a terminal, a version-address mapping relationship delivered by an element management system EMS, where the version-address mapping relationship includes a mapping relationship between an upgrade version number and a multicast program storage address, and a multicast program stored in the multicast program storage address is a multicast program obtained by encapsulating an upgrade version file supported by the type of terminal, receiving, by the terminal, an upgrade start instruction delivered by the EMS, sending, by the terminal in response to the upgrade start instruction, a multicast program on-demand request to a multicast server according to the multicast program storage address in the version-address mapping relationship, receiving, by the terminal, the multicast program that is stored in the multicast program storage address and sent by the multicast server, and performing, by the terminal, a version upgrade operation according to the received multicast program.

In a first possible implementation manner of the second aspect of the embodiments of the present invention, the performing, by the terminal, a version upgrade operation according to the received multicast program includes extracting, by the terminal, an upgrade version sub-file from the received multicast program, where the upgrade version sub-file includes a control header, and the control header includes information required for upgrading the terminal, combining, by the terminal, the upgrade version sub-file according to the control header included in the upgrade version sub-file, to obtain the upgrade version file supported by the type of terminal, and performing, by the terminal, the version upgrade operation according to the upgrade version file.

In a second possible implementation manner of the second aspect of the embodiments of the present invention, the receiving, by a terminal, a version-address mapping relationship delivered by an element management system EMS includes receiving, by the terminal, a target XML configuration file delivered by the EMS, where the version-address mapping relationship is loaded into the target XML configuration file.

With reference to the second possible implementation manner of the second aspect of the embodiments of the present invention, in a third possible implementation manner of the second aspect of the embodiments of the present invention, after the receiving, by the terminal, a target XML configuration file delivered by the EMS and before the receiving, by the terminal, an upgrade start instruction delivered by the EMS, the method further includes receiving, by the terminal, an upgrade test instruction delivered by the EMS, where the upgrade test instruction includes an upgrade check parameter, and the upgrade check parameter includes at least a current version number and an upgrade version number that are supported by the type of terminal, checking, by the terminal, the upgrade check parameter, to obtain a check result of checking the upgrade check parameter by the terminal, and reporting, by the terminal, the check result to the EMS, to trigger the EMS to deliver the upgrade start instruction to the terminal when the EMS determines that the check result is that the upgrade check parameter passes the check.

A third aspect of the embodiments of the present invention discloses an element management system, including an encapsulation unit, configured to encapsulate an upgrade version file supported by a type of terminal as a multicast program, and store the multicast program in a multicast server; or send an upgrade version file supported by a type of terminal to a multicast server, so that the multicast server encapsulates the upgrade version file as a multicast program, an establishment unit, configured to establish a version-address mapping relationship, where the version-address mapping relationship includes a mapping relationship between an upgrade version number and a multicast program storage address, a first communications unit, configured to: deliver the version-address mapping relationship to a terminal, and enable a second communications unit, and the second communications unit, configured to deliver an upgrade start instruction to the terminal, to trigger the terminal to send a multicast program on-demand request to the multicast server according to the multicast program storage address in the version-address mapping relationship, so that the terminal receives the multicast program that is stored in the multicast program storage address of the terminal and sent by the multicast server, and the terminal performs a version upgrade operation according to the received multicast program.

In a first possible implementation manner of the third aspect of the embodiments of the present invention, the encapsulating an upgrade version file supported by a type of terminal as a multicast program is specifically dividing the upgrade version file supported by the type of terminal into at least one upgrade version sub-file, allocating a control header to the upgrade version sub-file, where the control header includes information required for upgrading the terminal, and combining the upgrade version sub-file to obtain the multicast program of the upgrade version file.

With reference to the third aspect of the embodiments of the present invention or the first possible implementation manner of the third aspect of the embodiments of the present invention, in a second possible implementation manner of the third aspect of the embodiments of the present invention, the first communications unit includes a loading subunit, configured to load the version-address mapping relationship into an XML configuration file, to obtain a target XML configuration file, and a communications subunit, configured to: deliver the target XML configuration file to the terminal, and enable the second communications unit.

With reference to the second possible implementation manner of the third aspect of the embodiments of the present invention, in a third possible implementation manner of the third aspect of the embodiments of the present invention, the communications subunit is further configured to: after delivering the target XML configuration file to the terminal, deliver an upgrade test instruction to the terminal, where the upgrade test instruction includes an upgrade check parameter, and the upgrade check parameter includes at least a current version number and an upgrade version number that are supported by the type of terminal, the communications subunit is further configured to receive a check result, reported by the terminal, of checking the upgrade check parameter by the terminal, and the element management system further includes a first determining unit, configured to: determine whether the check result is that the upgrade check parameter passes the check, and if the upgrade check parameter passes the check, trigger the second communications unit to perform the operation of delivering an upgrade start instruction to the terminal.

A fourth aspect of the embodiments of the present invention discloses a terminal, including a first interaction unit, configured to receive a version-address mapping relationship delivered by an element management system EMS, where the version-address mapping relationship includes a mapping relationship between an upgrade version number and a multicast program storage address, and a multicast program stored in the multicast program storage address is a multicast program obtained by encapsulating an upgrade version file supported by the type of terminal, a second interaction unit, configured to receive an upgrade start instruction delivered by the EMS, a program on-demand unit, configured to send, in response to the upgrade start instruction, a multicast program on-demand request to a multicast server according to the multicast program storage address in the version-address mapping relationship, where the program on-demand unit is further configured to receive the multicast program that is stored in the multicast program storage address and sent by the multicast server, and an upgrade operation unit, configured to perform a version upgrade operation according to the received multicast program.

In a first possible implementation manner of the fourth aspect of the embodiments of the present invention, the upgrade operation unit includes a first extraction subunit, configured to extract an upgrade version sub-file from the received multicast program, where the upgrade version sub-file includes a control header, and the control header includes information required for upgrading the terminal, a file combination subunit, configured to combine the upgrade version sub-file according to the control header included in the upgrade version sub-file, to obtain the upgrade version file supported by the type of terminal, and a version upgrade subunit, configured to perform the version upgrade operation according to the upgrade version file.

In a second possible implementation manner of the fourth aspect of the embodiments of the present invention, the first interaction unit is configured to receive a target XML configuration file delivered by the EMS, where the version-address mapping relationship between an upgrade target version number supported by the type of terminal and the multicast program storage address is loaded into the target XML configuration file.

With reference to the second possible implementation manner of the fourth aspect of the embodiments of the present invention, in a third possible implementation manner of the fourth aspect of the embodiments of the present invention, the first interaction unit is further configured to: after receiving the target XML configuration file delivered by the EMS, receive an upgrade test instruction delivered by the EMS, where the upgrade test instruction includes an upgrade check parameter, and the upgrade check parameter includes at least a current version number and an upgrade version number that are supported by the type of terminal, the terminal further includes a parameter checking unit, configured to check the upgrade check parameter, to obtain a check result of checking the upgrade check parameter by the terminal, and the first interaction unit is further configured to report the check result to the EMS, to trigger the EMS to deliver the upgrade start instruction to the terminal when the EMS determines that the check result is that the upgrade check parameter passes the check.

A fifth aspect of the embodiments of the present invention discloses an element management system, including a receiver, a processor, a memory, and a transmitter, where the receiver, the processor, the memory, and the transmitter are separately connected to a bus, the memory stores a group of terminal upgrade program code, and the processor is configured to invoke the terminal upgrade program code stored in the memory, so as to receive, by using the receiver, an upgrade version file supported by a type of terminal, encapsulate the upgrade version file supported by the type of terminal as a multicast program, and transmit, by using the transmitter, the multicast program to a multicast server for storing; or send, by using the transmitter, the upgrade version file supported by the type of terminal to a multicast server, so that the multicast server encapsulates the upgrade version file as a multicast program, establish a version-address mapping relationship, where the version-address mapping relationship includes a mapping relationship between an upgrade version number and a multicast program storage address, deliver the version-address mapping relationship to the terminal by using the transmitter, and deliver an upgrade start instruction to the terminal by using the transmitter, to trigger the terminal to send a multicast program on-demand request to the multicast server according to the multicast program storage address in the version-address mapping relationship, so that the terminal receives the multicast program that is stored in the multicast program storage address of the terminal and sent by the multicast server, and the terminal performs a version upgrade operation according to the received multicast program.

In a first possible implementation manner of the fifth aspect of the embodiments of the present invention, the encapsulation unit is specifically configured to divide the upgrade version file supported by the type of terminal into at least one upgrade version sub-file, allocate a control header to the upgrade version sub-file, where the control header includes information required for upgrading the terminal, and combine the upgrade version sub-file to obtain the multicast program of the upgrade version file.

With reference to the fifth aspect of the embodiments of the present invention or the first possible implementation manner of the fifth aspect of the embodiments of the present invention, in a second possible implementation manner of the fifth aspect of the embodiments of the present invention, the processor is specifically configured to load the version-address mapping relationship into an XML configuration file, to obtain a target XML configuration file, and deliver the target XML configuration file to the terminal by using the transmitter.

With reference to the second possible implementation manner of the fifth aspect of the embodiments of the present invention, in a third possible implementation manner of the fifth aspect of the embodiments of the present invention, after the delivering, by the processor, the target XML configuration file to the terminal by using the transmitter and before the delivering, by the processor, an upgrade start instruction to the terminal by using the transmitter, the processor is further configured to deliver an upgrade test instruction to the terminal by using the transmitter, where the upgrade test instruction includes an upgrade check parameter, and the upgrade check parameter includes at least a current version number and an upgrade version number that are supported by the type of terminal, receive, by using the receiver, a check result, reported by the terminal, of checking the upgrade check parameter by the terminal, and Determine whether the check result is that the upgrade check parameter passes the check, and if the upgrade check parameter passes the check, perform the operation of delivering an upgrade start instruction to the terminal by using the transmitter.

A sixth aspect of the embodiments of the present invention discloses a terminal, including a receiver, a processor, a memory, and a transmitter, where the receiver, the processor, the memory, and the transmitter are separately connected to a bus, the memory stores a group of terminal upgrade program code, and the processor is configured to invoke the terminal upgrade program code stored in the memory, so as to receive, by using the receiver, a version-address mapping relationship delivered by an element management system EMS, where the version-address mapping relationship includes a mapping relationship between an upgrade version number and a multicast program storage address, and a multicast program stored in the multicast program storage address is a multicast program obtained by encapsulating an upgrade version file supported by the type of terminal, receive, by using the receiver, an upgrade start instruction delivered by the EMS, send, in response to the upgrade start instruction, a multicast program on-demand request to a multicast server according to the multicast program storage address in the version-address mapping relationship by using the transmitter, receive, by using the receiver, the multicast program that is stored in the multicast program storage address and sent by the multicast server, and perform a version upgrade operation according to the received multicast program.

In a first possible implementation manner of the sixth aspect of the embodiments of the present invention, the processor is specifically configured to extract an upgrade version sub-file from the received multicast program, where the upgrade version sub-file includes a control header, and the control header includes information required for upgrading the terminal, combine the upgrade version sub-file according to the control header included in the upgrade version sub-file, to obtain the upgrade version file supported by the type of terminal, and perform the version upgrade operation according to the upgrade version file.

In a second possible implementation manner of the sixth aspect of the embodiments of the present invention, the processor is specifically configured to receive, by using the receiver, a target XML configuration file delivered by the EMS, where the version-address mapping relationship is loaded into the target XML configuration file.

With reference to the second possible implementation manner of the sixth aspect of the embodiments of the present invention, in a third possible implementation manner of the sixth aspect of the embodiments of the present invention, after the receiving, by the processor by using the receiver, a target XML configuration file delivered by the EMS, and before the receiving, by the processor by using the receiver, an upgrade start instruction delivered by the EMS, the processor is further configured to receive, by using the receiver, an upgrade test instruction delivered by the EMS, where the upgrade test instruction includes an upgrade check parameter, and the upgrade check parameter includes at least a current version number and an upgrade version number that are supported by the type of terminal, check the upgrade check parameter, to obtain a check result of checking the upgrade check parameter by the terminal, and report the check result to the EMS by using the transmitter, to trigger the EMS to deliver the upgrade start instruction to the terminal when the EMS determines that the check result is that the upgrade check parameter passes the check.

Compared with the prior art, the embodiments of the present invention achieve the following beneficial effects:

In the embodiments of the present invention, an upgrade operation performed on a terminal (for example, an ONT) may be controlled by the terminal instead of an OLT, that is, the terminal may send a multicast program on-demand request to a multicast server according to a multicast program storage address in a version-address mapping relationship, receive a multicast program that is stored in the multicast program storage address and sent by the multicast server, and perform a version upgrade operation according to the received multicast program. In this way, the OLT may not perform upgrade operation control on the terminal (for example, the ONT), and the OLT is only used as a transmission path in a process of upgrading a version of the terminal, thereby effectively reducing a workload of the OLT. In addition, in the embodiments of the present invention, the terminal performs on-demand broadcast of a multicast program to implement version upgrading; therefore, parallel version upgrade operations can be implemented on a large quantity of terminals, which can improve terminal upgrade efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
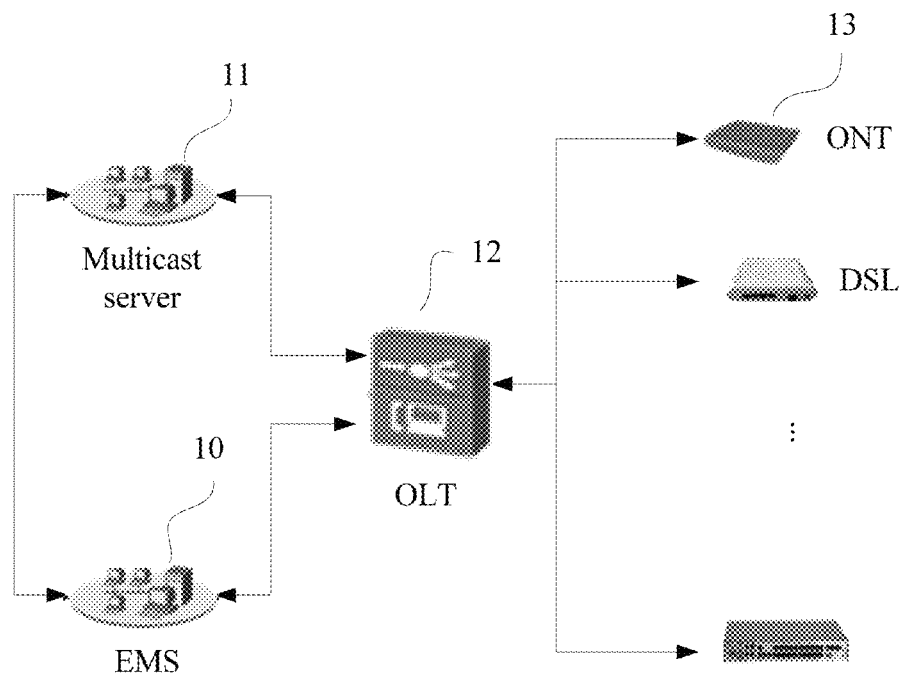
FIG. 1 is a schematic structural diagram of a terminal upgrade system disclosed in an embodiment of the present invention.

The embodiments of the present invention disclose a terminal upgrade method, a related device, and a system, which can effectively reduce a workload of an OLT and improve terminal upgrade efficiency. In the embodiments of the present invention, a terminal may be an ONT (including an active network unit or a passive network unit), or may be a digital subscriber line (DSL) terminal, which is not limited in the embodiments of the present invention. When the terminal is a DSL terminal, the DSL terminal may be connected to the OLT by using a copper wire. Detailed descriptions are separately provided in the following:

Referring to FIG. 1, FIG. 1 is a schematic structural diagram of an optical network terminal upgrade system disclosed in an embodiment of the present invention. The optical network terminal upgrade system shown in FIG. 1 may include:

an EMS 10, a multicast server 11, an OLT 12, and a terminal 13 managed by the OLT 12, where the terminal 13 is generally installed on a user side, and a user terminal such as a telephone, a computer, and an interactive personality TV (IPTV) may access the terminal 13. It should be noted that, in the terminal upgrade system shown in FIG. 1, a quantity of terminals 13 managed by the OLT 12 may be one or more, and when the quantity of terminals 13 managed by the OLT 12 is more than one, types of the multiple terminals 13 may be the same or may be different, or the multiple terminals 13 may be terminals of different vendors, which is not limited in this embodiment of the present invention.

In the terminal upgrade system shown in FIG. 1, the EMS 10 may be connected to the multicast server 11 by using a wired network (such as a fiber network) or a wireless network (such as a wireless local area network), the EMS 10 and the OLT 12 may communicate with each other by using the Simple Network Management Protocol (Simple Network Management Protocol, SNMP), and the multicast server 11 may be connected to the OLT 12 by using a wired network (such as a fiber network) or a wireless network (such as a wireless local area network). Optionally, the multicast server 11 may be connected to the terminal 13 by using a dedicated multicast path (which uses a proprietary protocol), the OLT 12 and the terminal 13 may be connected by using an optical fiber or a copper wire, and the OLT 12 and the terminal 13 may communicate with each other by using a protocol that includes but is not limited to the OMCI/OAM protocol, the FTP protocol, or the TR069 protocol.

In the terminal upgrade system shown in FIG. 1:

The EMS 10 encapsulates an upgrade version file supported by a type of terminal 13 as a multicast program, and stores the multicast program in the multicast server 11; or the EMS sends an upgrade version file supported by a type of terminal 13 to the multicast server 11, so that the multicast server 11 encapsulates the upgrade version file as a multicast program and stores the multicast program.

The EMS 10 establishes a version-address mapping relationship, where the established version-address mapping relationship includes a mapping relationship between an upgrade version number and a multicast program storage address, where the upgrade version number refers to a version number of the upgrade version file, and the multicast program storage address refers to a storage address, of the multicast program obtained by encapsulating the upgrade version file, in the multicast server 11, and optionally, the multicast program storage address may be returned by the multicast server 11 to the EMS 10, or the multicast program storage address may be specified by the EMS 10.

The EMS 10 is configured to: deliver the version-address mapping relationship to the terminal 13 via the OLT 12, and deliver an upgrade start instruction to the terminal 13 via the OLT 12.

Correspondingly, the terminal 13 receives the version-address mapping relationship delivered by the EMS 10 via the OLT 12, receives the upgrade start instruction delivered by the EMS 10 via the OLT 12, and sends, in response to the upgrade start instruction, a multicast program on-demand request to the multicast server 11 according to the multicast program storage address in the version-address mapping relationship. Optionally, the terminal 13 may send the multicast program on-demand request to the multicast server 11 via the OLT 12, or the terminal 13 may send the multicast program on-demand request to the multicast server 11 by using the dedicated multicast path between the terminal 13 and the multicast server 11, which is not limited in this embodiment of the present invention.

Correspondingly, the multicast server 11 sends the multicast program stored in the multicast program storage address to the terminal 13. Optionally, the multicast server 11 may send the multicast program stored in the multicast program storage address to the terminal 13 via the OLT 12, or the multicast server 11 may send the multicast program stored in the multicast program storage address to the terminal 13 by using the dedicated multicast path between the multicast server 11 and the terminal 13, which is not limited in this embodiment of the present invention.

Correspondingly, the terminal 13 further receives the multicast program that is stored in the multicast program storage address and sent by the multicast server 11, and performs a version upgrade operation according to the multicast program.

As an optional implementation manner, a manner in which the EMS 10 or the multicast server 11 encapsulates the upgrade version file supported by the type of terminal 13 as the multicast program may be:

dividing the upgrade version file supported by the type of terminal 13 into at least one upgrade version sub-file, where a purpose of dividing, by the EMS 10, the upgrade version file supported by the type of terminal 13 into at least one upgrade version sub-file is to make the upgrade version sub-file better adapt to a channel transmission feature;

allocating a control header to the upgrade version sub-file, where the control header includes information required for upgrading the terminal; and combining the upgrade version sub-file to obtain the multicast program of the upgrade version file.

It should be noted that, the information required for upgrading the terminal that is included in the foregoing control header may include a software upgrade package validity flag bit, a packet header CRC, a quantity of files in the upgrade package, an upgrade version number, an IP address of the multicast server, a port number of the multicast server, and upgrade control description information.

Correspondingly, in this embodiment of the present invention, a manner in which the terminal 13 performs the version upgrade operation according to the multicast program may be as follows:

the terminal 13 extracts an upgrade version sub-file from the received multicast program, where the upgrade version sub-file includes the control header, and the control header includes the information required for upgrading the terminal;

the terminal 13 combines the upgrade version sub-file according to the control header included in the upgrade version sub-file, to obtain the upgrade version file supported by the type of terminal; and the terminal 13 performs the version upgrade operation according to the upgrade version file.

As an optional implementation manner, a manner in which the EMS 10 delivers the version-address mapping relationship to the terminal 13 via the OLT 12 may be specifically as follows:

the EMS 10 is configured to load the version-address mapping relationship into an XML configuration file, to obtain a target XML configuration file; and the EMS 10 is further configured to deliver the target XML configuration file to the terminal 13 via the OLT 12.

Correspondingly, a manner in which the terminal 13 receives the version-address mapping relationship delivered by the EMS 10 via the OLT 12 may be as follows:

the terminal 13 is configured to receive the target XML configuration file, into which the version-address mapping relationship is loaded, delivered by the EMS 10 via the OLT 12, so as to achieve a purpose of receiving a correspondence, delivered by the EMS 10 via the OLT 12, between the upgrade version number supported by the type of terminal 13 and the multicast program storage address.

For example, when the OLT 12 manages n terminals 13 (where n is a natural number greater than 1), the EMS 10 may load, into an XML configuration file, version-address mapping relationships including mapping relationships between upgrade version numbers supported by types of the terminals 13 and a multicast program storage address, to obtain a target XML configuration file. That is, n version-address mapping relationships may be loaded into the target XML configuration file. Further, the EMS 10 may deliver the target XML configuration file to the n terminals 13 via the OLT 12. In this embodiment of the present invention, in order to reduce occupation of a memory of a terminal 13 by the target XML configuration file as far as possible, after receiving the target XML configuration file delivered by the EMS 10 via the OLT 12, each terminal 13 may retain only a version-address mapping relationship, loaded into the target XML configuration file, including a mapping relationship between an upgrade version number supported by a type of terminal 13 and a multicast program storage address, and filter out the other version-address mapping relationships. For example, after the $n^{th}$ terminal 13 receives the target XML configuration file delivered by the EMS 10 via the OLT 12, the $n^{th}$ terminal 13 may retain only a version-address mapping relationship, loaded into the target XML configuration file, including a mapping relationship between an upgrade version number supported by a type of the $n^{th}$ terminal 13 and a multicast program storage address, and filter out the other version-address mapping relationships.

As an optional implementation manner, in the terminal upgrade system shown in FIG. 1, after the EMS 10 delivers the target XML configuration file to the terminal 13 via the OLT 12, the EMS 10 may first test whether the terminal 13 supports the version upgrade operation, and the EMS 10 starts the version upgrade operation on the terminal 13 only when the terminal 13 supports the version upgrade operation, where a specific manner is as follows:

after delivering the target XML configuration file to the terminal 13 via the OLT 12, the EMS 10 further delivers an upgrade test instruction to the terminal 13 via the OLT 12, where the upgrade test instruction includes an upgrade check parameter, the upgrade check parameter includes at least a current version number and an upgrade version number that are supported by the type of terminal 13, and the upgrade check parameter may further include information such as manufacturer information supported by the type of terminal 13.

Correspondingly, the terminal 13 further receives the upgrade test instruction delivered by the EMS 10 via the OLT 12, checks the upgrade check parameter included in the upgrade test instruction, to obtain a check result of checking the upgrade check parameter by the terminal 13, and reports the check result to the EMS 10 via the OLT 12. For example, when the upgrade check parameter includes the current version number, the upgrade version number, and the manufacturer information that are supported by the type of terminal 13, the terminal 13 may check whether a version number of a supported current version is the same as the current version number that is supported by the terminal 13 and included in the upgrade check parameter, the terminal 13 may check whether the upgrade version number included in the upgrade check parameter is valid, and the terminal 13 may check whether the manufacturer information included in the upgrade check parameter is supported; and the terminal 13 reports the check result to the EMS 10 via the OLT 12.

Correspondingly, the EMS 10 is further configured to: receive the check result, reported by the terminal 13 via the OLT 12, of checking the upgrade check parameter by the terminal 13, and determine whether the check result is that the upgrade check parameter passes the check. If the upgrade check parameter passes the check, which indicates that the terminal 13 supports the version upgrade operation, the EMS 10 may perform the operation of delivering an upgrade start instruction to the terminal 13 via the OLT 12. For example, when the terminal 13 checks that the version number of the supported current version is the same as the current version number that is supported by the terminal 13 and included in the upgrade check parameter, the terminal 13 checks that the upgrade version number included in the upgrade check parameter is valid, and the terminal 13 checks that the manufacturer information included in the upgrade check parameter is supported, the terminal 13 may report, to the EMS 10 via the OLT 12, the check result that is used to indicate that the upgrade check parameter passes the check. In this way, when the EMS determines that the check result is that the upgrade check parameter passes the check, which indicates that the terminal 13 supports the version upgrade operation, the EMS 10 performs the operation of delivering an upgrade start instruction to the terminal 13 via the OLT 12.

As another optional implementation manner, in the terminal upgrade system shown in FIG. 1, after the EMS 10 determines that the check result of checking the upgrade check parameter by the terminal 13 is that the upgrade check parameter passes the check, the EMS 10 may first determine whether an EMS upgrade policy is met, and perform the operation of delivering an upgrade start instruction to the terminal 13 via the OLT 12 only when the EMS upgrade policy is met; otherwise, the EMS 10 may defer performing the operation of delivering an upgrade start instruction to the terminal 13 via the OLT 12. It should be noted that the EMS upgrade policy may be an upgrade policy preset in the terminal or may be an upgrade policy delivered by the EMS, which is not specifically limited in the present invention.

The EMS 10 is further configured to: after determining that the check result of checking the upgrade check parameter by the terminal 13 is that the upgrade check parameter passes the check, determine whether a preset EMS upgrade policy is met, and if the preset EMS upgrade policy is met, perform the operation of delivering an upgrade start instruction to the terminal 13 via the OLT 12.

The EMS upgrade policy may include any one of or a combination of the following policies:

1. A specified upgrade time is reached;
2. The terminal 13 is a terminal of a specified type; or 3. An upgrade target version supported by the terminal 13 is an upgrade target version of a specified vendor.

As another optional implementation manner, in the terminal upgrade system shown in FIG. 1, a unique CRC check value may be added to the foregoing target XML configuration file, where the CRC check value is used to compare whether versions are consistent. Correspondingly, a manner in which the EMS 10 delivers the target XML configuration file to the terminal 13 via the OLT 12 may be specifically as follows:

the terminal 13 is configured to report a CRC check value added to a remote XML configuration file to the EMS 10 via the OLT 12, where the remote XML configuration file is used to load a remote mapping relationship, and the remote mapping relationship is a mapping relationship between the current version number supported by the type of terminal 13 and a storage address of a multicast program obtained by encapsulating a current version; and correspondingly, the EMS 10 is configured to: receive the CRC check value that is added to the remote XML configuration file and reported by the terminal 13 via the OLT 12; and compare the CRC check value added to the remote XML configuration file with the CRC check value added to the target XML configuration file, and if the CRC check values are inconsistent, deliver a protocol message including the target XML configuration file to the terminal 13 via the OLT 12.

In this embodiment of the present invention, the terminal 13 may report the CRC check value added to the remote XML configuration file to the EMS 10 via the OLT 12 when power is on. When the EMS 10 determines, by means of the comparison, that the CRC check value added to the remote XML configuration file and the CRC check value added to the target XML configuration file are inconsistent, the EMS 10 may learn that the multicast program obtained by encapsulating the current version supported by the terminal 13 and the multicast program obtained by encapsulating the upgrade target version supported by the terminal 13 are different. In this case, the EMS 10 may deliver the target XML configuration file (where the version-address mapping relationship between the upgrade version number supported by the terminal 13 and the multicast program storage address is loaded into the target XML configuration file) to the terminal 13 via the OLT 12, so as to subsequently start the version upgrade operation on the terminal 13.

As another optional implementation manner, in the terminal upgrade system shown in FIG. 1, the terminal 13 is further configured to: after receiving the upgrade start instruction delivered by the EMS 10 via the OLT 12, first determine whether a preset terminal upgrade policy is met, and only if the preset terminal upgrade policy is met, perform the operation of sending, in response to the upgrade start instruction, a multicast program on-demand request to the multicast server 11 according to the multicast program storage address in the version-address mapping relationship, where the terminal upgrade policy may include any one of or a combination of the following: there is no on-demand service or voice service on the terminal, or a current load of the terminal is less than a preset load value, where the on-demand service may include a high-definition video on-demand service, and the current load of the terminal refers to a current load of a processor of the terminal.

In an embodiment, the terminal upgrade policy may further include that: the terminal determines that there is a multicast program stored in the multicast program storage address. Specifically, the terminal may send a multicast program query request to the multicast server according to the multicast program storage address, receive a query response sent by the multicast server, and determine, according to the query response, whether there is a multicast program stored in the multicast program storage address.

In this embodiment of the present invention, only when determining that a preset terminal upgrade policy is met, a terminal 13 performs an operation of sending, in response to an upgrade start instruction, a multicast program on-demand request to a multicast server 11 according to a multicast program storage address in a version-address mapping relationship, which can implement adaptive control of a version upgrade operation on the terminal 13, effectively prevent the version upgrade from affecting a service used by a user (for example, a high-definition video on-demand service is not playing smoothly), and/or effectively prevent the version upgrade from increasing the current load of the terminal, thereby preventing the terminal from breaking down. A terminal can acquire, from a multicast server, a version upgrade file required for upgrading the terminal, that is, the terminal acquires the upgrade version file from the multicast server instead of an OLT. Therefore, tasks of upgrading terminals of different vendors and of different types can be performed concurrently without being limited by a processing capability of the OLT.

As another optional implementation manner, in the terminal upgrade system shown in FIG. 1, a manner in which the terminal 13 performs the version upgrade operation according to the upgrade version file may be specifically as follows:

the terminal 13 is configured to perform the version upgrade operation on the terminal 13 in a state machine manner according to the upgrade version file. Performing the version upgrade operation on the terminal in the state machine manner can ensure complete upgrading of a version and can further avoid repeated upgrading to a same upgrade version.

In the terminal upgrade system shown in FIG. 1, an upgrade operation performed on a terminal (for example, an ONT) may be controlled by the terminal (for example, the ONT) instead of an OLT, that is, the terminal (for example, the ONT) may send a multicast program on-demand request to a multicast server according to a multicast program storage address in a version-address mapping relationship, receive a multicast program that is stored in the multicast program storage address and sent by the multicast server, and perform a version upgrade operation according to the multicast program. In this way, the OLT may not perform upgrade operation control on the terminal (for example, the ONT), and the OLT is only used as a transmission path in a process of upgrading a version of the terminal (for example, the ONT), thereby effectively reducing a workload of the OLT. In addition, in the terminal upgrade system shown in FIG. 1, the terminal (for example, the ONT) performs on-demand broadcast of a multicast program to implement version upgrading; therefore, parallel version upgrade operations can be implemented on a large quantity of terminals (for example, ONTs), which can improve terminal (for example, ONT) upgrade efficiency.

The foregoing already describes the terminal upgrade system disclosed in this embodiment of the present invention, and the following further describes the EMS in the terminal upgrade system disclosed in this embodiment of the present invention.

Figure 2:
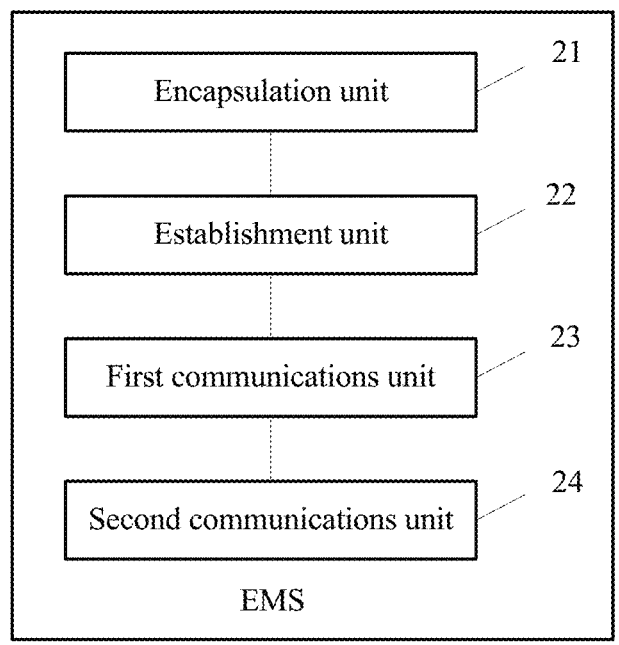
FIG. 2 is a schematic structural diagram of an EMS disclosed in an embodiment of the present invention.

Referring to FIG. 2, FIG. 2 is a schematic structural diagram of an EMS disclosed in an embodiment of the present invention, where the EMS shown in FIG. 2 may include:

an encapsulation unit 21, configured to: encapsulate, as a multicast program, an upgrade version file supported by a type of terminal (for example, an ONT) managed by an OLT, and store the multicast program in a multicast server; or send an upgrade version file supported by a type of terminal to a multicast server, so that the multicast server encapsulates the upgrade version file as a multicast program and stores the multicast program;

an establishment unit 22, configured to establish a version-address mapping relationship, where the version-address mapping relationship includes a mapping relationship between an upgrade version number and a multicast program storage address, and optionally, the multicast program storage address may be returned by the multicast server to the encapsulation unit 21, or the multicast program storage address may be specified by the encapsulation unit 21;

a first communications unit 23, configured to: deliver the version-address mapping relationship to a terminal via the OLT, and enable a second communications unit 24; and the second communications unit 24, configured to deliver an upgrade start instruction to the terminal via the OLT, to trigger the terminal to send a multicast program on-demand request to the multicast server according to the multicast program storage address in the version-address mapping relationship, so that the terminal receives the multicast program that is stored in the multicast program storage address and sent by the multicast server, and the terminal performs a version upgrade operation according to the received multicast program.

Figure 3:
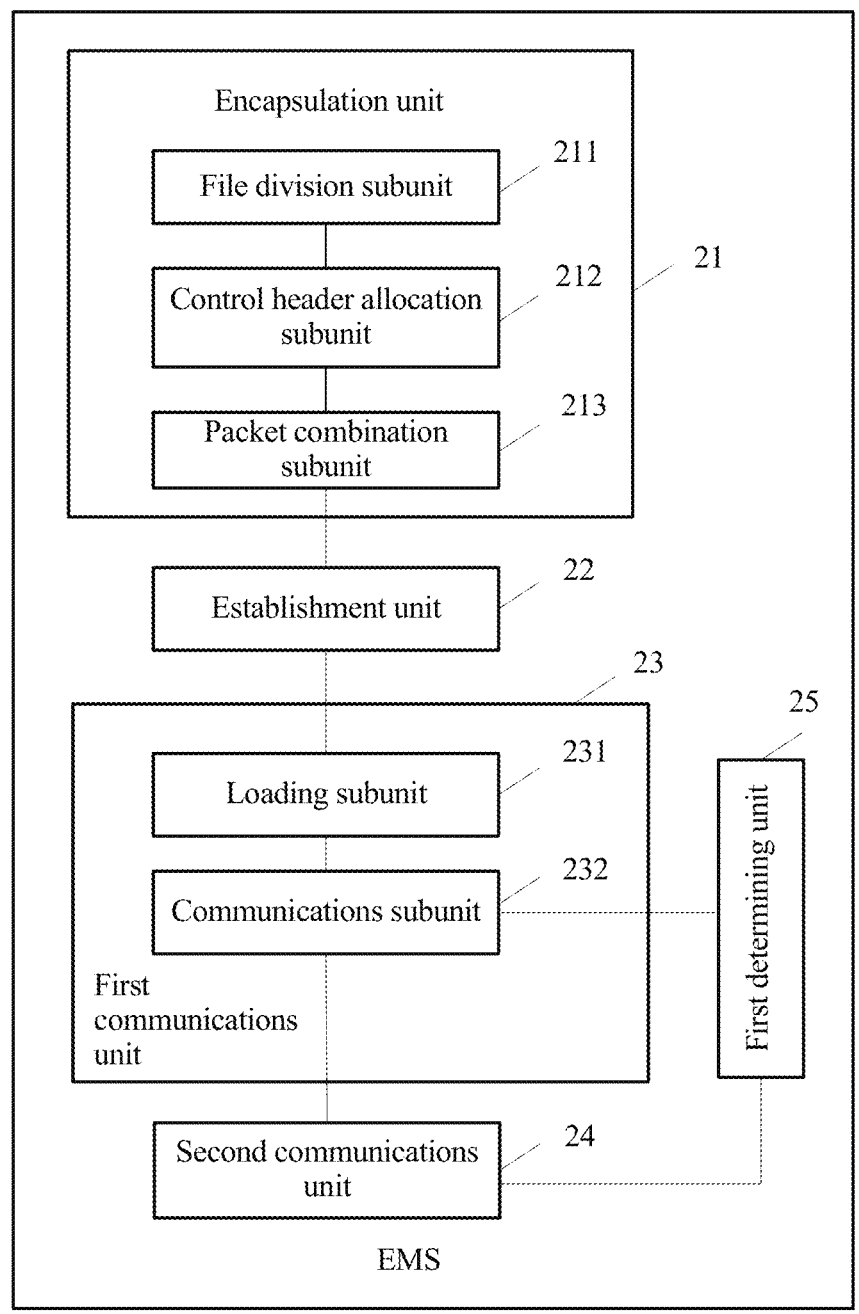
FIG. 3 is a schematic structural diagram of another EMS disclosed in an embodiment of the present invention.

Also referring to FIG. 3, FIG. 3 is a schematic structural diagram of another EMS disclosed in an embodiment of the present invention, where the EMS shown in FIG. 3 is obtained by optimizing the EMS shown in FIG. 2.

In the EMS shown in FIG. 3, the encapsulation unit 21 may include:

a file division subunit 211, configured to divide the upgrade target version file supported by the type of terminal into at least one upgrade target version sub-file;

a control header allocation subunit 212, configured to allocate a control header to the upgrade version sub-file, where the control header includes information required for upgrading the terminal; and a packet combination subunit 213, configured to combine the upgrade version sub-file to obtain the multicast program of the upgrade version file, and store the multicast program in the multicast server.

Optionally, the multicast program storage address may be returned by the multicast server to the packet combination subunit 213 of the encapsulation unit 21, or the multicast program storage address may be specified by the packet combination subunit 213 of the encapsulation unit 21.

In the EMS shown in FIG. 3, the first communications unit 23 may include:

a loading subunit 231, configured to load the version-address mapping relationship into an XML configuration file, to obtain a target XML configuration file; and a communications subunit 232, configured to: deliver the target XML configuration file to the terminal via the OLT, and enable the second communications unit 24.

As an optional implementation manner, in the EMS shown in FIG. 3, the communications subunit 232 is further configured to: after delivering the target XML configuration file to the terminal via the OLT, deliver an upgrade test instruction to the terminal via the OLT, where the upgrade test instruction may include an upgrade check parameter, the upgrade check parameter may include at least a current version number and an upgrade version number that are supported by the type of terminal, and the upgrade check parameter may further include manufacturer information supported by the terminal.

Correspondingly, the communications subunit 232 is further configured to receive a check result, reported by the terminal via the OLT, of checking the upgrade check parameter by the terminal; for example, when the upgrade check parameter includes the current version number, the upgrade version number, and the manufacturer information that are supported by the type of terminal, the terminal may check whether a version number of a supported current version is the same as the current version number that is supported by the terminal and included in the upgrade check parameter, the terminal may check whether the upgrade version number included in the upgrade check parameter is valid, and the terminal may check whether the manufacturer information included in the upgrade check parameter is supported; and the terminal reports the check result to the EMS via an OLT 1.

Correspondingly, the EMS shown in FIG. 3 may further include a first determining unit 25, configured to: determine whether the check result is that the upgrade check parameter passes the check, and if the upgrade check parameter passes the check, trigger the second communications unit 24 to perform the operation of delivering an upgrade start instruction to the terminal via the OLT. For example, when the terminal checks that the version number of the supported current version is the same as the current version number that is supported by the terminal and included in the upgrade check parameter, the terminal checks that the upgrade version number included in the upgrade check parameter is valid, and the terminal checks that the manufacturer information included in the upgrade check parameter is supported, the terminal may report, to the EMS via the OLT, the check result that is used to indicate that the upgrade check parameter passes the check. In this way, when the first determining unit 25 of the EMS determines that the check result is that the upgrade check parameter passes the check, which indicates that the terminal supports upgrading to a target version, the first determining unit 25 may trigger the second communications unit 24 to perform the operation of delivering an upgrade start instruction to the terminal via the OLT.

Figure 4:
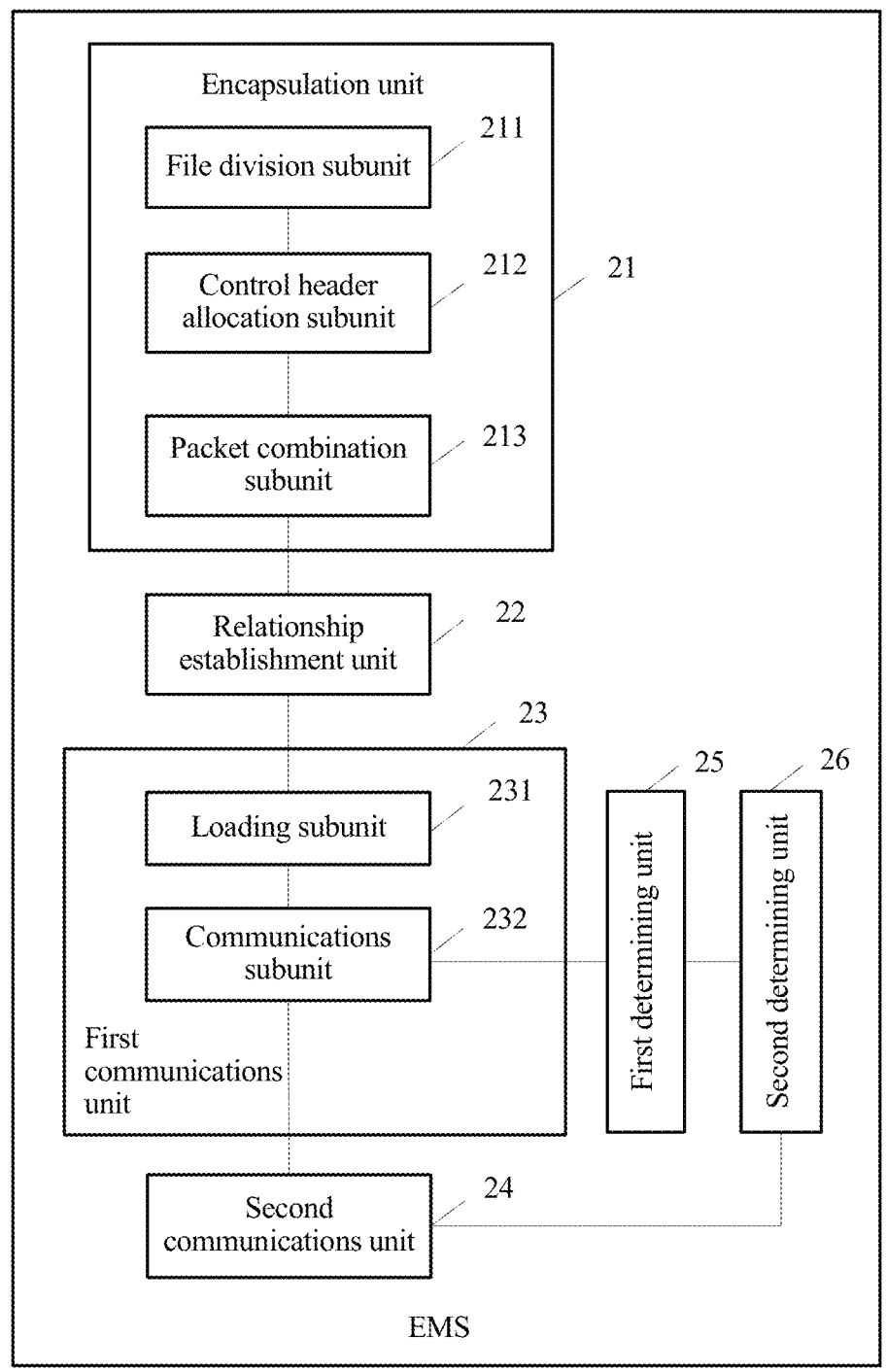
FIG. 4 is a schematic structural diagram of still another EMS disclosed in an embodiment of the present invention.

Also referring to FIG. 4, FIG. 4 is a schematic structural diagram of still another EMS disclosed in an embodiment of the present invention, where the EMS shown in FIG. 4 is obtained by optimizing the EMS shown in FIG. 3. The EMS shown in FIG. 4 further includes:

a second determining unit 26, configured to: after the first determining unit 25 determines that the check result is that the upgrade check parameter passes the check, determine whether an EMS upgrade policy is met, and if the EMS upgrade policy is met, trigger the second communications unit 24 to perform the operation of delivering an upgrade start instruction to the terminal via the OLT.

The EMS upgrade policy may include any one of or a combination of the following policies:

1. A specified upgrade time is reached;
2. The terminal is a terminal of a specified type; or
3. An upgrade target version supported by the terminal is an upgrade target version of a specified vendor.

As an optional implementation manner, in the EMSs shown in FIG. 3 and FIG. 4, a unique CRC check value may be added to the foregoing target XML configuration file, where the CRC check value is used to compare whether versions are consistent. Correspondingly, a manner in which the foregoing communications subunit 232 delivers the target XML configuration file to the terminal via the OLT may be specifically as follows:

the communications subunit 232 is configured to receive a CRC check value that is added to a remote XML configuration file and reported by the terminal via the OLT, where the remote XML configuration file is used to load a remote mapping relationship, and the remote mapping relationship is a mapping relationship between the current version number supported by the type of terminal and a storage address of a multicast program obtained by encapsulating a current version; and the communications subunit 232 is configured to compare the CRC check value added to the remote XML configuration file with the CRC check value added to the target XML configuration file, and the communications subunit 232 is configured to: if a result of comparing by a comparison module is that the CRC check values are inconsistent, deliver a protocol message including the target XML configuration file to the terminal via the OLT.

In this embodiment of the present invention, the terminal may report the CRC check value added to the remote XML configuration file to the EMS via the OLT when power is on. When the communications subunit 232 determines, by means of the comparison, that the CRC check value added to the remote XML configuration file and the CRC check value added to the target XML configuration file are inconsistent, the communications subunit 232 may learn that the multicast program obtained by encapsulating the current version supported by the terminal and the multicast program obtained by encapsulating the upgrade target version supported by the terminal are different. In this case, the communications subunit 232 may deliver the target XML configuration file to the terminal via the OLT, so as to subsequently start the version upgrade operation on the terminal.

In this embodiment of the present invention, the foregoing protocol message includes but is not limited to an OMCI/OAM protocol message, an FTP protocol message, or a TR069 protocol message.

By implementing the EMSs shown in FIG. 2 to FIG. 4, an upgrade operation performed on a terminal (for example, an ONT) may be controlled by the terminal instead of an OLT. In this way, the OLT may not perform upgrade operation control on the terminal, and the OLT is only used as a transmission path in a process of upgrading a version of the terminal, thereby effectively reducing a workload of the OLT. In addition, by implementing the EMSs shown in FIG. 2 to FIG. 4, the terminal performs on-demand broadcast of a multicast program to implement version upgrading; therefore, parallel version upgrade operations can be implemented on a large quantity of terminals, which can improve terminal upgrade efficiency. A terminal can acquire, from a multicast server, a version upgrade file required for upgrading the terminal, that is, the terminal acquires the upgrade version file from the multicast server instead of an OLT. Therefore, tasks of upgrading terminals of different vendors and of different types can be performed concurrently without being limited by a processing capability of the OLT.

Figure 5:
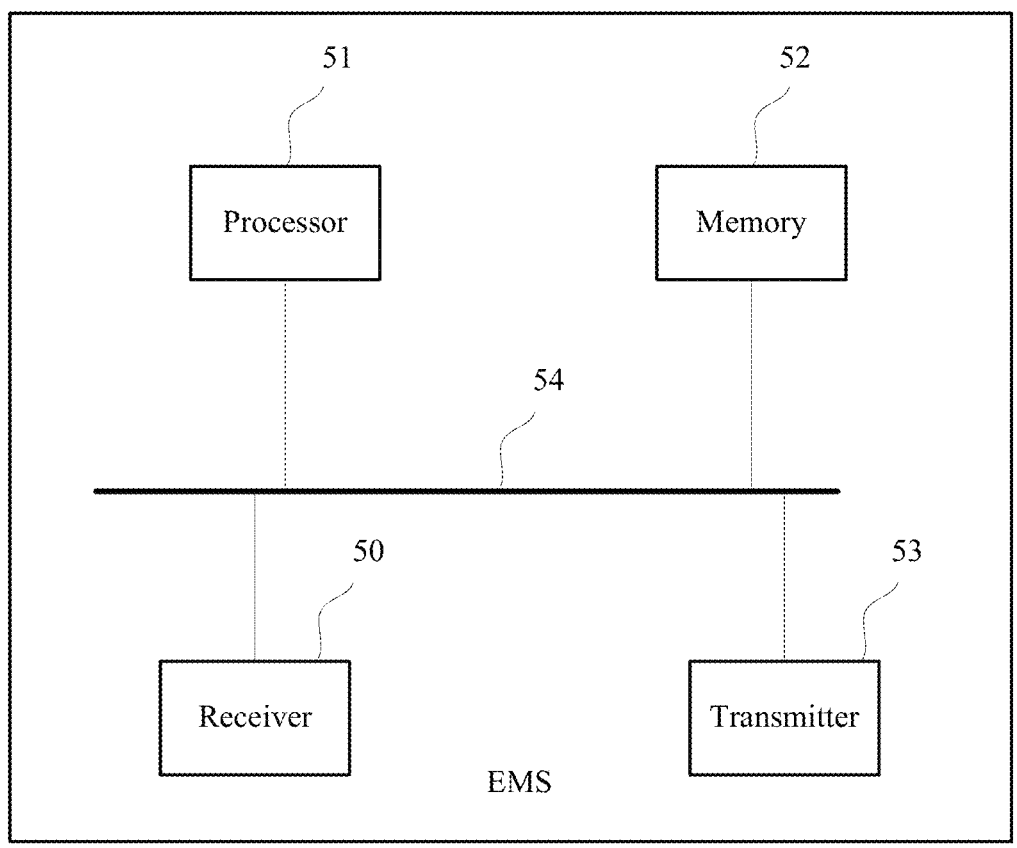
FIG. 5 is a schematic structural diagram of yet another EMS disclosed in an embodiment of the present invention.

Referring to FIG. 5, FIG. 5 is a schematic structural diagram of yet another EMS disclosed in an embodiment of the present invention. The element management system EMS shown in FIG. 5 may include a receiver 50, a processor 51, a memory 52, and a transmitter 53, where the receiver 50, the processor 51, the memory 52, and the transmitter 53 are separately connected to a bus 54, the memory 52 stores a group of terminal upgrade program code, and the processor 51 is configured to invoke the terminal upgrade program code stored in the memory 52, so as to:

receive, by using the receiver 50, an upgrade version file supported by a type of terminal;

encapsulate, as a multicast program, the upgrade version file supported by the type of terminal managed by an OLT, and transmit, by using the transmitter 53, the multicast program to a multicast server for storing; or send, by using the transmitter 53, the upgrade version file supported by the type of terminal to a multicast server, so that the multicast server encapsulates the upgrade version file as a multicast program and stores the multicast program;

establish a version-address mapping relationship, where the version-address mapping relationship includes a mapping relationship between an upgrade version number and a multicast program storage address, and optionally, the multicast program storage address may be returned by the multicast server to the processor 51 by using the receiver 50, or the multicast program storage address may be specified by the processor 51;

delivering, by using the transmitter 53, the version-address mapping relationship to the terminal via the OLT; and delivering, by using the transmitter 53, an upgrade start instruction to the terminal via the OLT, to trigger the terminal to send a multicast program on-demand request to the multicast server according to the multicast program storage address in the version-address mapping relationship, so that the terminal receives the multicast program that is stored in the multicast program storage address and sent by the multicast server, and the terminal performs a version upgrade operation according to the received multicast program.

As an optional implementation manner, in the EMS shown in FIG. 5, the processor 51 is specifically configured to:

divide the upgrade version file supported by the type of terminal into at least one upgrade version sub-file;

allocate a control header to the upgrade version sub-file, where the control header includes information required for upgrading the terminal; and combine the upgrade version sub-file to obtain the multicast program of the upgrade version file.

As an optional implementation manner, in the EMS shown in FIG. 5, the processor 51 may be specifically configured to:

load the version-address mapping relationship into an XML configuration file, to obtain a target XML configuration file; and deliver, by using the transmitter 53, the target XML configuration file to the terminal via the OLT.

As an optional implementation manner, in the EMS shown in FIG. 5, after the delivering, by the processor 51 by using the transmitter 53, the target XML configuration file to the terminal via the OLT, and before the delivering, by the processor 51 by using the transmitter 53, an upgrade start instruction to the terminal via the OLT, the processor 51 is further configured to:

deliver, by using the transmitter 53, an upgrade test instruction to the terminal via the OLT, where the upgrade test instruction includes an upgrade check parameter, the upgrade check parameter includes at least a current version number and an upgrade version number that are supported by the type of terminal, and the upgrade check parameter may further include manufacturer information supported by the terminal;

receive, by using the receiver 50, a check result, reported by the terminal via the OLT, of checking the upgrade check parameter by the terminal; for example, when the upgrade check parameter includes the current version number, the upgrade target version number, and the manufacturer information that are supported by the type of terminal, the terminal may check whether a version number of a supported current version is the same as the current version number that is supported by the terminal and included in the upgrade check parameter, the ONT may check whether the upgrade version number included in the upgrade check parameter is valid, and the terminal may check whether the manufacturer information included in the upgrade check parameter is supported; and the terminal reports the check result to the EMS via an OLT 1; and determine whether the check result is that the upgrade check parameter passes the check, and if the upgrade check parameter passes the check, perform the operation of delivering, by using the transmitter 53, an upgrade start instruction to the terminal via the OLT. For example, when the terminal checks that the version number of the supported current version is the same as the current version number that is supported by the type of terminal and included in the upgrade check parameter, the terminal checks that the upgrade version number included in the upgrade check parameter is valid, and the terminal checks that the manufacturer information included in the upgrade check parameter is supported, the terminal may report, to the EMS via the OLT, the check result that is used to indicate that the upgrade check parameter passes the check. In this way, when the processor 51 of the EMS determines that the check result is that the upgrade check parameter passes the check, which indicates that the terminal supports version upgrading, the processor 51 may perform the operation of delivering an upgrade start instruction to the terminal via the OLT.

As an optional implementation manner, in the EMS shown in FIG. 5, after determining, by the processor 51, that the check result is that the upgrade check parameter passes the check, and before the delivering, by the processor 51 by using the transmitter 53, an upgrade start instruction to the terminal via the OLT, the processor 51 is further configured to:

determine whether an EMS upgrade policy is met, and if the EMS upgrade policy is met, perform the operation of delivering, by using the transmitter 53, an upgrade start instruction to the terminal via the OLT.

The EMS upgrade policy may include any one of or a combination of the following policies:

1. A specified upgrade time is reached;
2. The terminal is a terminal of a specified type; or
3. An upgrade target version supported by the terminal is an upgrade target version of a specified vendor.

As an optional implementation manner, in the EMS shown in FIG. 5, a unique CRC check value may be added to the foregoing target XML configuration file, where the CRC check value is used to compare whether versions are consistent. Correspondingly, the processor 51 may be specifically configured to:

receive, by using the receiver 50, a CRC check value that is added to a remote XML configuration file and reported by the terminal via the OLT, where the remote XML configuration file is used to load a remote mapping relationship, and the remote mapping relationship is a mapping relationship between the current version number supported by the type of terminal and a storage address of a multicast program obtained by encapsulating a current version; and compare the CRC check value added to the remote XML configuration file with the CRC check value added to the target XML configuration file, and if the CRC check values are inconsistent, deliver, by using the transmitter 53, a protocol message including the target XML configuration file to the terminal via the OLT.

In this embodiment of the present invention, the terminal may report the CRC check value added to the remote XML configuration file to the EMS via the OLT when power is on. When the processor 51 determines, by means of the comparison, that the CRC check value added to the remote XML configuration file and the CRC check value added to the target XML configuration file are inconsistent, the processor 51 may learn that the multicast program obtained by encapsulating the current version supported by the terminal and the multicast program obtained by encapsulating the upgrade target version supported by the terminal are different. In this case, the processor 51 may deliver the target XML configuration file to the terminal via the OLT, so as to subsequently start the version upgrade operation on the terminal.

In this embodiment of the present invention, the foregoing protocol message includes but is not limited to an OMCI/OAM protocol message, an FTP protocol message, or a TR069 protocol message.

By implementing the EMS shown in FIG. 5, an upgrade operation performed on a terminal may be controlled by the terminal instead of an OLT. In this way, the OLT may not perform upgrade operation control on the terminal, and the OLT is only used as a transmission path in a process of upgrading a version of the terminal, thereby effectively reducing a workload of the OLT. In addition, by implementing the EMS shown in FIG. 5, the terminal performs on-demand broadcast of a multicast program to implement version upgrading; therefore, parallel version upgrade operations can be implemented on a large quantity of terminals, which can improve terminal upgrade efficiency. A terminal can acquire, from a multicast server, a version upgrade file required for upgrading the terminal, that is, the terminal acquires the upgrade version file from the multicast server instead of an OLT. Therefore, tasks of upgrading terminals of different vendors and of different types can be performed concurrently without being limited by a processing capability of the OLT.

Figure 6:
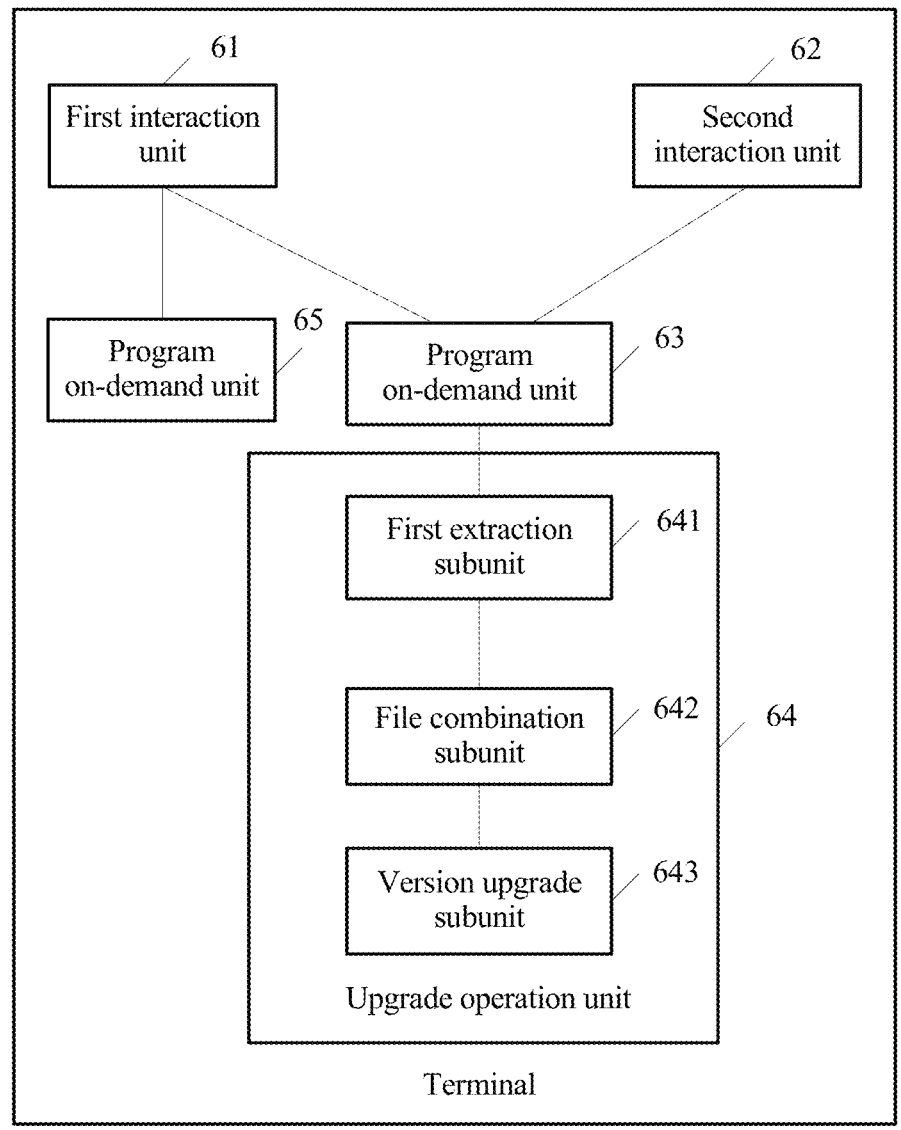
FIG. 6 is a schematic structural diagram of a terminal disclosed in an embodiment of the present invention.

The following further describes the terminal in the optical terminal upgrade system disclosed in the embodiments of the present invention. Referring to FIG. 6, FIG. 6 is a schematic structural diagram of a terminal disclosed in an embodiment of the present invention. As shown in FIG. 6, the terminal may include:

a first interaction unit 61, configured to receive a version-address mapping relationship delivered by an EMS, where the version-address mapping relationship includes a mapping relationship between an upgrade version number and a multicast program storage address, a multicast program stored in the multicast program storage address is a multicast program obtained by encapsulating an upgrade version file supported by a type of terminal, and the upgrade version number refers to a version number of the upgrade version file;

a second interaction unit 62, configured to receive an upgrade start instruction delivered by the EMS via an OLT;

a program on-demand unit 63, configured to send, in response to the upgrade start instruction, a multicast program on-demand request to a multicast server according to the multicast program storage address in the version-address mapping relationship, where the foregoing program on-demand unit 63 is further configured to receive the multicast program that is stored in the multicast program storage address and sent by the multicast server; and an upgrade operation unit 64, configured to perform a version upgrade operation according to the received multicast program.

As an optional implementation manner, in the terminal shown in FIG. 6, the upgrade operation unit 64 may include:

a first extraction subunit 641, configured to extract an upgrade version sub-file from the received multicast program, where the upgrade version sub-file includes a control header, and the control header includes information required for upgrading the terminal;

a file combination subunit 642, configured to combine the upgrade version sub-file according to the control header included in the upgrade version sub-file, to obtain the upgrade version file supported by the type of terminal; and a version upgrade subunit 643, configured to perform the version upgrade operation according to the upgrade version file.

As an optional implementation manner, in the terminal shown in FIG. 6, the first interaction unit 61 may be configured to receive a target XML configuration file delivered by the EMS via the OLT, where the version-address mapping relationship is loaded into the target XML configuration file, thereby achieving a purpose that the first interaction unit 61 receives the version-address mapping relationship, delivered by the EMS via the OLT, between an upgrade version number supported by the type of terminal and the multicast program storage address.

As an optional implementation manner, in the terminal shown in FIG. 6, the first interaction unit 61 is further configured to: after receiving the target XML configuration file delivered by the EMS via the OLT, receive an upgrade test instruction delivered by the EMS via the OLT, where the upgrade test instruction includes an upgrade check parameter, the upgrade check parameter includes at least a current version number and an upgrade version number that are supported by the type of terminal, and the upgrade check parameter may further include manufacturer information supported by the terminal.

Correspondingly, the terminal shown in FIG. 6 may further include a parameter checking unit 65, configured to check the upgrade check parameter, to obtain a check result of checking the upgrade check parameter by the terminal; for example, when the upgrade check parameter includes the current version number, the upgrade version number, and the manufacturer information that are supported by the type of terminal, the parameter checking unit 65 may check whether a version number of a current version supported by the type of terminal is the same as the current version number that is supported by the terminal and included in the upgrade check parameter, may check whether the upgrade version number included in the upgrade check parameter is valid, and may check whether the manufacturer information included in the upgrade check parameter is supported; and the check result is reported to the EMS via the OLT.

Correspondingly, the first interaction unit 61 is further configured to report the check result to the EMS via the OLT, to trigger the EMS to deliver, via the OLT, the upgrade start instruction to the terminal when the EMS determines that the check result is that the upgrade check parameter passes the check. For example, when the terminal checks that the version number of the supported current version is the same as the current version number that is supported by the terminal and included in the upgrade check parameter, the terminal checks that the upgrade version number included in the upgrade check parameter is valid, and the terminal checks that the manufacturer information included in the upgrade check parameter is supported, the first interaction unit 61 may report, to the EMS via the OLT, the check result that is used to indicate that the upgrade check parameter passes the check. In this way, when the EMS determines that the check result is that the upgrade check parameter passes the check, which indicates that the terminal supports upgrading to a target version, the EMS may perform an operation of delivering the upgrade start instruction to the terminal via the OLT.

As an optional implementation manner, in the terminal shown in FIG. 6, a unique CRC check value may be added to the foregoing target XML configuration file, where the CRC check value is used to compare whether versions are consistent. Correspondingly, a manner in which the first interaction unit 61 receives the target XML configuration file delivered by the EMS via the OLT may be specifically as follows:

the first interaction unit 61 is configured to report a CRC check value added to a remote XML configuration file to the EMS via the OLT, where the remote XML configuration file is used to load a remote mapping relationship, and the remote mapping relationship is a mapping relationship between the current version number supported by the type of terminal and a storage address of a multicast program obtained by encapsulating a current version; and the first interaction unit 61 is further configured to receive a protocol message that includes the target XML configuration file and that is delivered by the EMS via the OLT after the EMS determines, by means of comparison, that the CRC check value added to the remote XML configuration file and the CRC check value added to the target XML configuration file are inconsistent.

In this embodiment of the present invention, the first interaction unit 61 may report the CRC check value added to the remote XML configuration file to the EMS via the OLT when power is on. When the EMS determines, by means of the comparison, that the CRC check value added to the remote XML configuration file and the CRC check value added to the target XML configuration file are inconsistent, the EMS may learn that the multicast program obtained by encapsulating the current version supported by the terminal and the multicast program obtained by encapsulating the upgrade target version supported by the terminal are different. In this case, the EMS may deliver the target XML configuration file to the terminal via the OLT, so as to subsequently start the version upgrade operation on the terminal.

In this embodiment of the present invention, the foregoing protocol message includes but is not limited to an OMCI/OAM protocol message, an FTP protocol message, or a TR069 protocol message.

Figure 7:
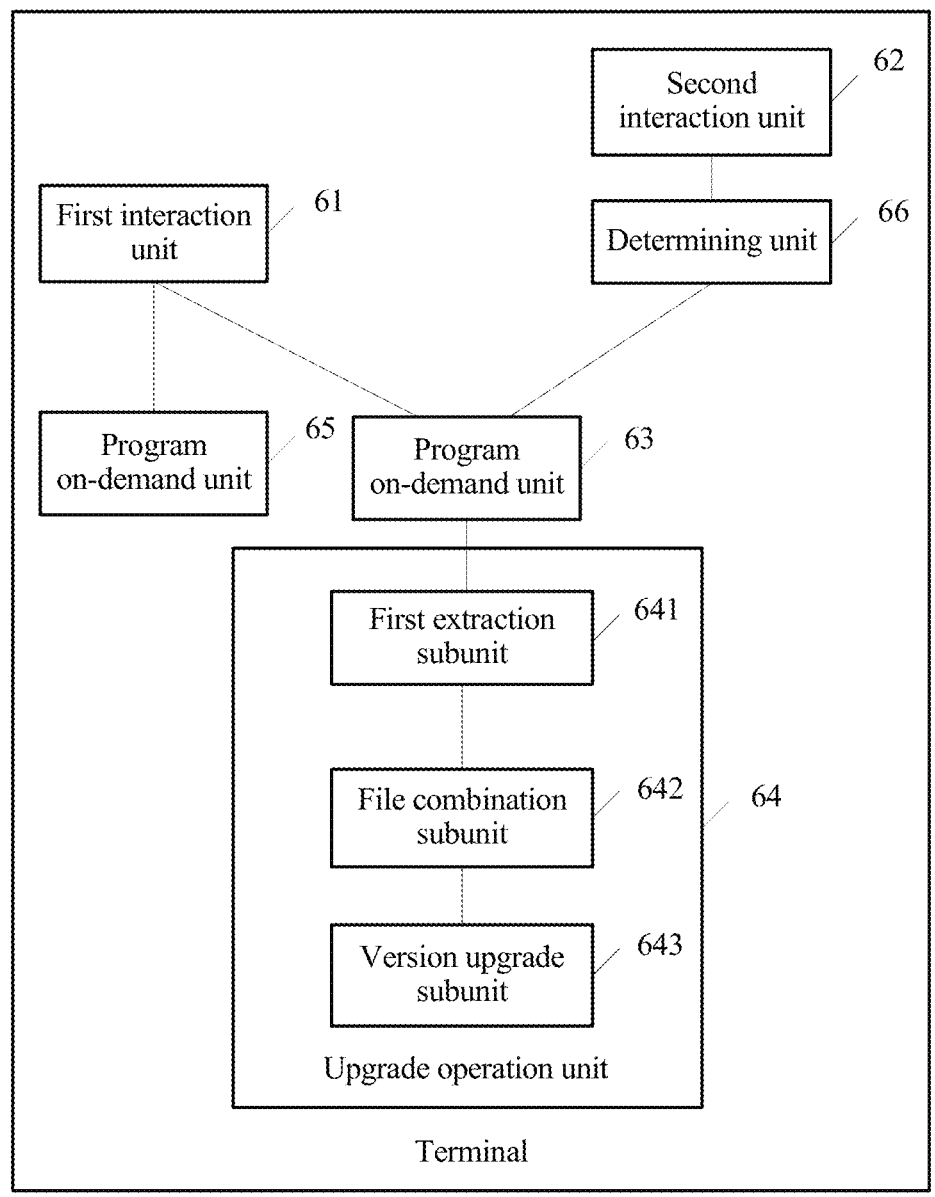
FIG. 7 is a schematic structural diagram of another terminal disclosed in an embodiment of the present invention.

Also referring to FIG. 7, FIG. 7 is a schematic structural diagram of another terminal disclosed in an embodiment of the present invention, where the terminal shown in FIG. 7 is obtained by optimizing the terminal shown in FIG. 6. Compared with the terminal shown in FIG. 6, the terminal shown in FIG. 7 may further include:

a determining unit 66, configured to: after the second interaction unit 62 receives the upgrade start instruction delivered by the EMS via the OLT, determine whether a preset terminal upgrade policy is met, and if the preset terminal upgrade policy is met, trigger the program on-demand unit 64 to perform the operation of sending, in response to the upgrade start instruction, a multicast program on-demand request to a multicast server according to the multicast program storage address in the version-address mapping relationship, where the terminal upgrade policy may include any one of or a combination of the following: there is no on-demand service or voice service on the terminal, or a current load of the terminal is less than a preset load value, where the on-demand service may include a high-definition video on-demand service, and the current load of the terminal refers to a current load of a processor of the terminal.

In this embodiment of the present invention, only when the determining unit 66 determines that the preset terminal upgrade policy is met, the program on-demand unit 64 is triggered to perform the operation of sending, in response to the upgrade start instruction, a multicast program on-demand request to a multicast server according to the multicast program storage address in the version-address mapping relationship, so that the terminal can perform adaptive control of terminal version upgrading, which can effectively prevent the version upgrade from affecting a service used by a user (such as, a high-definition video on-demand service is not playing smoothly), and/or can effectively prevent the version upgrade from increasing the current load of the terminal, thereby preventing the terminal from breaking down.

As another optional implementation manner, in the terminal shown in FIG. 6, a manner in which the version upgrade subunit 643 performs the version upgrade operation according to the upgrade version file may be specifically as follows:

the version upgrade subunit 643 is configured to perform the version upgrade operation on the terminal in a state machine manner according to the upgrade version file. Performing the version upgrade operation on the terminal in the state machine manner can ensure complete upgrading of a version and can further avoid repeated upgrading to a same upgrade version.

In the terminals shown in FIG. 6 and FIG. 7, the terminal may function as an entity for controlling an upgrade operation. In this way, an OLT may not perform upgrade operation control on the terminal, and the OLT is only used as a transmission path in a process of upgrading a version of the terminal, thereby effectively reducing a workload of the OLT. In addition, the terminal performs on-demand broadcast of a multicast program to implement version upgrading; therefore, parallel version upgrade operations can be implemented on a large quantity of terminals, which can improve terminal upgrade efficiency. A terminal can acquire, from a multicast server, a version upgrade file required for upgrading the terminal, that is, the terminal acquires the upgrade version file from the multicast server instead of an OLT. Therefore, tasks of upgrading terminals of different vendors and of different types can be performed concurrently without being limited by a processing capability of the OLT.

Figure 8:
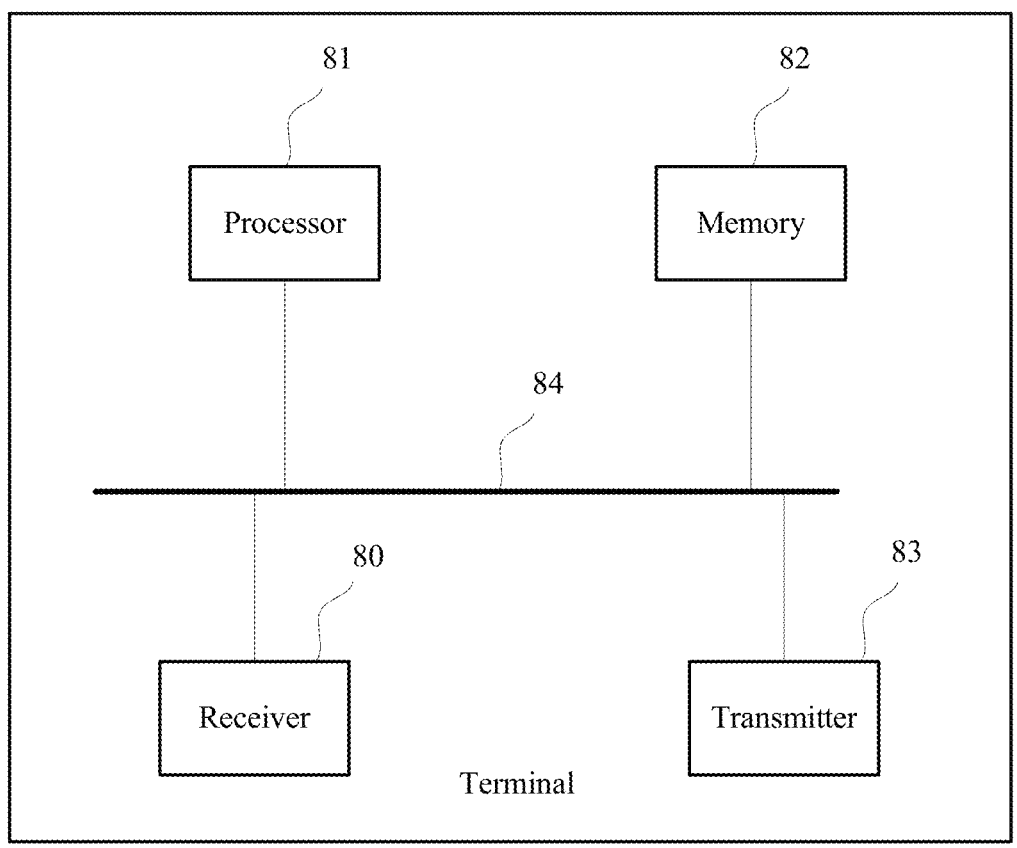
FIG. 8 is a schematic structural diagram of still another terminal disclosed in an embodiment of the present invention.

Referring to FIG. 8, FIG. 8 is a schematic structural diagram of still another terminal disclosed in an embodiment of the present invention. The terminal shown in FIG. 8 may include a receiver 80, a processor 81, a memory 82, and a transmitter 83, where the receiver 80, the processor 81, the memory 82, and the transmitter 83 are separately connected to a bus 84, the memory 82 stores a group of terminal upgrade program code, and the processor 81 is configured to invoke the terminal upgrade program code stored in the memory 82, so as to:

receive, by using the receiver 80, a version-address mapping relationship delivered by an EMS via an OLT, where the version-address mapping relationship includes a mapping relationship between an upgrade version number and a multicast program storage address, and a multicast program stored in the multicast program storage address is a multicast program obtained by encapsulating an upgrade version file supported by a type of terminal;

receive, by using the receiver 80, an upgrade start instruction delivered by the EMS via the OLT;

send, in response to the upgrade start instruction, a multicast program on-demand request to a multicast server according to the multicast program storage address in the version-address mapping relationship by using the transmitter 83;

receive, by using the receiver 80, the multicast program that is stored in the multicast program storage address and sent by the multicast server; and perform a version upgrade operation according to the received multicast program.

As an optional implementation manner, in the terminal shown in FIG. 8, the processor 81 is specifically configured to:

extract an upgrade version sub-file from the received multicast program, where the upgrade version sub-file includes a control header, and the control header includes information required for upgrading the terminal;

combine the upgrade version sub-file according to the control header included in the upgrade version sub-file, to obtain the upgrade version file supported by the type of terminal; and perform the version upgrade operation according to the upgrade version file.

As an optional implementation manner, in the terminal shown in FIG. 8, the processor 81 may be specifically configured to:

receive, by using the receiver 80, a target XML configuration file delivered by the EMS via the OLT, where the version-address mapping relationship is loaded into the target XML configuration file, thereby achieving a purpose that the processor 81 receives the version-address mapping relationship, delivered by the EMS via the OLT, between an upgrade version number supported by the type of terminal and the multicast program storage address.

As an optional implementation manner, in the terminal shown in FIG. 8, after the receiving, by the processor 81 by using the receiver 80, a target XML configuration file delivered by the EMS via the OLT, and before the receiving, by the processor 81 by using the receiver 80, an upgrade start instruction delivered by the EMS via the OLT, the processor 81 is further configured to:

receive, by using the receiver 80, an upgrade test instruction delivered by the EMS via the OLT, where the upgrade test instruction includes an upgrade check parameter, the upgrade check parameter includes at least a current version number and an upgrade version number that are supported by the type of terminal, and the upgrade check parameter may further include manufacturer information supported by the terminal;

check the upgrade check parameter, to obtain a check result of checking the upgrade check parameter by the terminal; and report, by using the transmitter 83, the check result to the EMS via the OLT, to trigger the EMS to deliver the upgrade start instruction to the terminal via the OLT when the EMS determines that the check result is that the upgrade check parameter passes the check.

For example, when the upgrade check parameter includes the current version number, the upgrade version number, and the manufacturer information that are supported by the type of terminal, the processor 81 may check whether a version number of a current version supported by the terminal is the same as the current version number that is supported by the terminal and included in the upgrade check parameter, may check whether the upgrade version number included in the upgrade check parameter is valid, and may check whether the manufacturer information included in the upgrade check parameter is supported; and the processor 81 reports the check result to the EMS via the OLT; and when the terminal checks that the version number of the supported current version is the same as the current version number that is supported by the terminal and included in the upgrade check parameter, the terminal checks that the upgrade version number included in the upgrade check parameter is valid, and the terminal checks that the manufacturer information included in the upgrade check parameter is supported, the processor 81 may report, to the EMS via the OLT, the check result that is used to indicate that the upgrade check parameter passes the check. In this way, when the EMS determines that the check result is that the upgrade check parameter passes the check, which indicates that the terminal supports version upgrading, the EMS may perform an operation of delivering the upgrade start instruction to the terminal via the OLT.

As an optional implementation manner, in the terminal shown in FIG. 8, a unique CRC check value may be added to the foregoing target XML configuration file, where the CRC check value is used to compare whether versions are consistent. Correspondingly, the processor 81 may be specifically configured to:

report, by using the transmitter 83, a CRC check value added to a remote XML configuration file to the EMS via the OLT, where the remote XML configuration file is used for a remote mapping relationship, and the remote mapping relationship is a mapping relationship between the current version number supported by the type of terminal and a storage address of a multicast program obtained by encapsulating a current version; and receive, by using the receiver 80, a protocol message that includes the target XML configuration file and that is delivered by the EMS via the OLT after the EMS determines, by means of comparison, that the CRC check value added to the remote XML configuration file and the CRC check value added to the target XML configuration file are inconsistent.

In this embodiment of the present invention, the processor 81 may report the CRC check value added to the remote XML configuration file to the EMS via the OLT when power is on. When the EMS determines, by means of the comparison, that the CRC check value added to the remote XML configuration file and the CRC check value added to the target XML configuration file are inconsistent, the EMS may learn that the multicast program obtained by encapsulating the current version supported by the terminal and the multicast program obtained by encapsulating the upgrade version supported by the terminal are different. In this case, the EMS may deliver the target XML configuration file to the terminal via the OLT, so as to subsequently start the version upgrade operation on the terminal.

In this embodiment of the present invention, the foregoing protocol message includes but is not limited to an OMCI/OAM protocol message, an FTP protocol message, or a TR069 protocol message.

As an optional implementation manner, in the terminal shown in FIG. 8, after the receiving, by the processor 81 by using the receiver 80, an upgrade start instruction delivered by the EMS via the OLT, and before the sending, by the processor 81 in response to the upgrade start instruction, a multicast program on-demand request to a multicast server according to the multicast program storage address in the version-address mapping relationship by using the transmitter 83, the processor 81 is further configured to:

determine whether a preset terminal upgrade policy is met, and if the preset terminal upgrade policy is met, perform the operation of sending, in response to the upgrade start instruction, a multicast program on-demand request to a multicast server according to the multicast program storage address in the version-address mapping relationship by using the transmitter 83, where the terminal upgrade policy may include any one of or a combination of the following: there is no on-demand service or voice service on the terminal, or a current load of the terminal is less than a preset load value, where the on-demand service may include a high-definition video on-demand service, and the current load of the terminal refers to a current load of a processor of the terminal.

In this embodiment of the present invention, only when determining that the preset terminal upgrade policy is met, the processor 81 performs the operation of sending, in response to the upgrade start instruction, a multicast program on-demand request to a multicast server according to the multicast program storage address in the version-address mapping relationship, so that adaptive control of the version upgrade operation can be implemented, which can effectively prevent the version upgrade from affecting a service used by a user (such as, a high-definition video on-demand service is not playing smoothly), and/or can effectively prevent the version upgrade from increasing the current load of the terminal, thereby preventing the terminal from breaking down.

As another optional implementation manner, in the terminal shown in FIG. 8, the processor 81 is specifically configured to:

perform the version upgrade operation on the terminal in a state machine manner according to the upgrade version file, where performing the version upgrade operation on the terminal in the state machine manner can ensure complete upgrading of a version and can further avoid repeated upgrading to a same upgrade version.

In the terminal shown in FIG. 8, the terminal may function as an entity for controlling an upgrade operation. In this way, an OLT may not perform upgrade operation control on the terminal, and the OLT is only used as a transmission path in a process of upgrading a version of the terminal, thereby effectively reducing a workload of the OLT. In addition, the terminal performs on-demand broadcast of a multicast program to implement version upgrading; therefore, parallel version upgrade operations can be implemented on a large quantity of terminals, which can improve terminal upgrade efficiency. A terminal can acquire, from a multicast server, a version upgrade file required for upgrading the terminal, that is, the terminal acquires the upgrade version file from the multicast server instead of an OLT. Therefore, tasks of upgrading terminals of different vendors and of different types can be performed concurrently without being limited by a processing capability of the OLT.

The foregoing describes the terminal upgrade system, the EMS, and the terminal disclosed in the embodiments of the present invention, and the following further describes an optical terminal upgrade method disclosed in an embodiment of the present invention.

Figure 9:
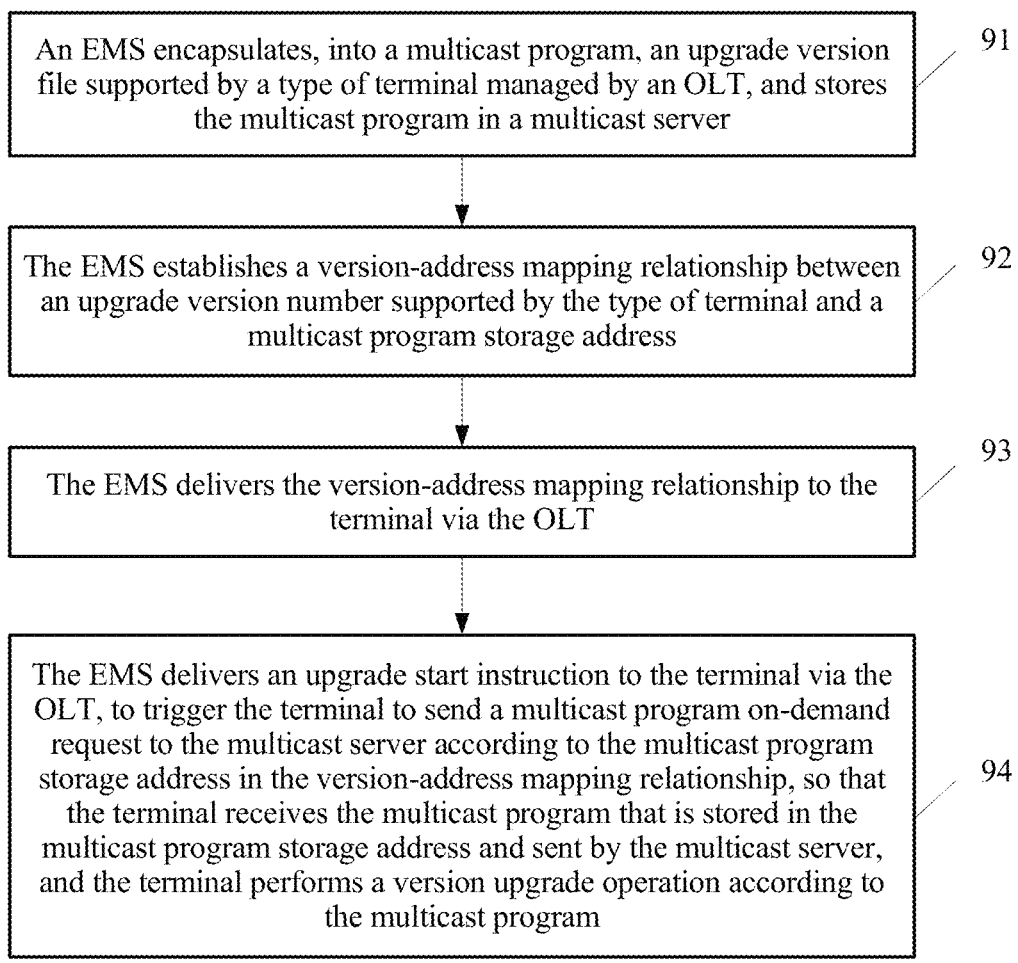
FIG. 9 is a schematic flowchart of a terminal upgrade method disclosed in an embodiment of the present invention.

Referring to FIG. 9, FIG. 9 is a schematic flowchart of a terminal upgrade method disclosed in an embodiment of the present invention. The method described in FIG. 9 is described from a perspective of an EMS. As shown in FIG. 9, the method may include the following steps:

91. The EMS encapsulates, as a multicast program, an upgrade version file supported by a type of terminal managed by an OLT, and stores the multicast program in a multicast server.

92. The EMS establishes a version-address mapping relationship between an upgrade version number supported by the type of terminal and a multicast program storage address.

93. The EMS delivers the version-address mapping relationship to the terminal via the OLT.

94. The EMS delivers an upgrade start instruction to the terminal via the OLT, to trigger the terminal to send a multicast program on-demand request to the multicast server according to the multicast program storage address in the version-address mapping relationship, so that the terminal receives the multicast program that is stored in the multicast program storage address and sent by the multicast server, and the terminal performs a version upgrade operation according to the multicast program.

In this embodiment of the present invention, the version-address mapping relationship, established by the EMS in step 92, between the upgrade target version number supported by the type of terminal and the multicast program storage address of the terminal may include key parameters listed in the following Table 1:

TABLE 1

Key parameters included in the version-address mapping relationship

| Name | Name description | Type | Value range |
|---|---|---|---|
| InternetGatewayDevice.DeviceInfo. | General device information | object | — |
| Manufacturer | Manufacturer | string | [0:64] |
| ManufacturerOUI | Manufacturer OUI | string | [0:6] |
| ModelName | Device name | string | [0:64] |
| Description | Device description | string | [0:256] |
| ProductClass | Product category | string | [0:64] |
| SoftwareVersion | Upgrade version number | string | [0:64] |
| AdditionalSoftwareVersion | Additional upgrade version number description | string | [0:64] |
| SpecVersion | Upgrade version flag | string | [0:16] |
| Igmp Program V4 | IGMP V4 multicast program storage address | string | [0:4] |
| Igmp Program V6 | IGMP V6 multicast program storage address | string | [0:16] |

In this embodiment of the present invention, a manner in which the EMS delivers the version-address mapping relationship to the terminal via the OLT in the foregoing step 93 may be specifically as follows:

the EMS loads the version-address mapping relationship into an XML configuration file, to obtain a target XML configuration file, and the EMS delivers the target XML configuration file to the terminal via the OLT.

In this embodiment of the present invention, the EMS may deliver a protocol message including the target XML configuration file to the terminal via the OLT, thereby achieving a purpose of delivering the target XML configuration file to the terminal via the OLT. The protocol message may include but is not limited to an OMCI/OAM protocol message, an FTP protocol message, or a TR069 protocol message.

In this embodiment of the present invention, when the OLT fails to deliver the protocol message including the target XML configuration file to the terminal, the terminal notifies the OLT, so that the OLT delivers the protocol message including the target XML configuration file again.

As another possible implementation manner, in the method described in FIG. 9, after the EMS delivers the target XML configuration file to the terminal via the OLT and before the EMS performs step 94, the EMS may further perform the following steps:

the EMS delivers an upgrade test instruction to the terminal via the OLT, where the upgrade test instruction includes an upgrade check parameter, and the upgrade check parameter includes at least a current version number and an upgrade version number that are supported by the type of terminal;

the EMS receives a check result, reported by an ONT via the OLT, of checking the upgrade check parameter by the terminal; and the EMS determines whether the check result is that the upgrade check parameter passes the check, and if the upgrade check parameter passes the check, performs step 94.

In this embodiment of the present invention, when the EMS determines that the check result is that the upgrade check parameter passes the check, which indicates that the terminal supports version upgrading, the EMS performs step 94, thereby starting the version upgrade operation on the terminal.

As another optional implementation manner, in the method described in FIG. 9, after the EMS determines that the check result is that the upgrade check parameter passes the check, and before the EMS performs step 94, the EMS may further perform the following step:

the EMS determines whether a preset EMS upgrade policy is met, and if the preset EMS upgrade policy is met, the EMS performs step 94.

As an optional implementation manner, in the method described in FIG. 9, a unique CRC check value may be added to the foregoing target XML configuration file, where the CRC check value is used to compare whether versions are consistent. Correspondingly, that the EMS delivers the target XML configuration file to the terminal via the OLT may include the following:

the EMS receives a CRC check value that is added to a remote XML configuration file and reported by the terminal via the OLT, where the remote XML configuration file is used to load a remote mapping relationship, and the remote mapping relationship is a mapping relationship between the current version number supported by the type of terminal and a storage address of a multicast program obtained by encapsulating a current version; and the EMS compares the CRC check value added to the remote XML configuration file with the CRC check value added to the target XML configuration file, and if the CRC check values are inconsistent, delivers a protocol message including the target XML configuration file to the terminal via the OLT.

In the method described in FIG. 9, an upgrade operation performed on a terminal may be controlled by the terminal instead of an OLT. In this way, the OLT may not perform upgrade operation control on the terminal, and the OLT is only used as a transmission path in a process of upgrading a version of the terminal, thereby effectively reducing a workload of the OLT. In addition, in the method described in FIG. 9, the terminal performs on-demand broadcast of a multicast program to implement version upgrading; therefore, parallel version upgrade operations can be implemented on a large quantity of terminals, which can improve terminal upgrade efficiency.

Figure 10:
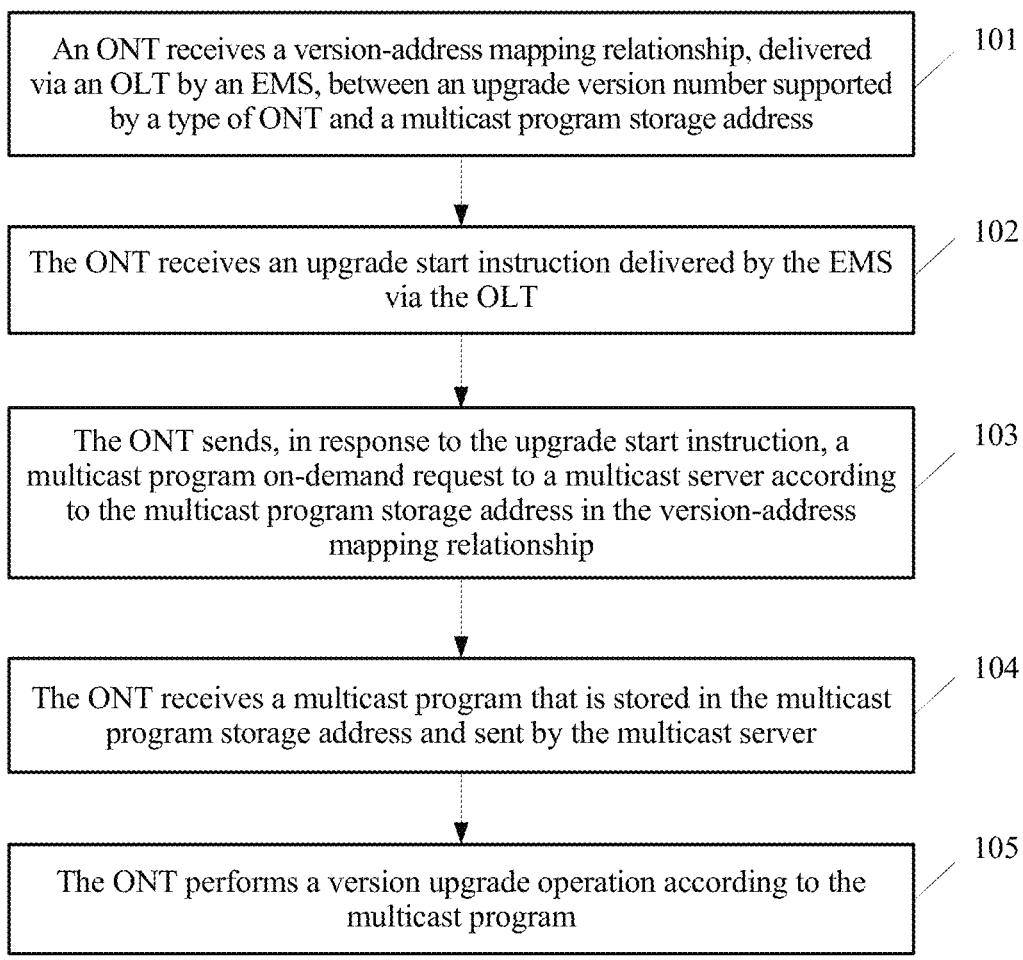
FIG. 10 is a schematic flowchart of another terminal upgrade method disclosed in an embodiment of the present invention.

Referring to FIG. 10, FIG. 10 is a schematic flowchart of another terminal upgrade method disclosed in an embodiment of the present invention. The method described in FIG. 10 is described from a perspective of an ONT. As shown in FIG. 10, the method may include the following steps:

101. The ONT receives a version-address mapping relationship, delivered by an EMS via an OLT, between an upgrade version number supported by a type of ONT and a multicast program storage address, where a multicast program stored in the multicast program storage address is a multicast program obtained by encapsulating an upgrade version supported by the type of ONT.

102. The ONT receives an upgrade start instruction delivered by the EMS via the OLT.

103. The ONT sends, in response to the upgrade start instruction, a multicast program on-demand request to a multicast server according to the multicast program storage address in the version-address mapping relationship.

104. The ONT receives the multicast program that is stored in the multicast program storage address and sent by the multicast server.

105. The ONT performs a version upgrade operation according to the multicast program.

As an optional implementation manner, in step 101, of the method described in FIG. 10, that the ONT receives a version-address mapping relationship, delivered by an EMS via an OLT, between an upgrade version number supported by a type of ONT and a multicast program storage address may include the following:

the ONT receives a target XML configuration file delivered by the EMS via the OLT, where the version-address mapping relationship between the upgrade version number supported by the type of ONT and the multicast program storage address is loaded into the target XML configuration file.

As an optional implementation manner, in the method described in FIG. 10, after the ONT receives the target XML configuration file delivered by the EMS via the OLT, and before the ONT performs the foregoing step 102 of receiving an upgrade start instruction delivered by the EMS via the OLT, the ONT may further perform the following step:

the ONT receives an upgrade test instruction delivered by the EMS via the OLT, where the upgrade test instruction includes an upgrade check parameter, and the upgrade check parameter includes at least a current version number and a target upgrade version number supported by the ONT;

the ONT checks the upgrade check parameter, to obtain a check result of checking the upgrade check parameter by the ONT; and the ONT reports the check result to the EMS via the OLT, to trigger the EMS to deliver the upgrade start instruction to the ONT via the OLT when the EMS determines that the check result is that the upgrade check parameter passes the check.

In this embodiment of the present invention, when the EMS determines that the check result is that the upgrade check parameter passes the check, which indicates that ONT supports version upgrading, the EMS may deliver the upgrade start instruction to the ONT via the OLT.

As an optional implementation manner, in the method described in FIG. 10, a unique CRC check value may be added to the foregoing target XML configuration file, where the CRC check value is used to compare whether versions are consistent. Correspondingly, that the ONT receives a target XML configuration file delivered by the EMS via the OLT includes the following:

the ONT reports a CRC check value added to a remote XML configuration file to the EMS via the OLT, where the remote XML configuration file is used to load a remote mapping relationship, and the remote mapping relationship is a mapping relationship between the current version number supported by the type of ONT and a storage address of a multicast program obtained by encapsulating a current version; and the ONT receives a protocol message that includes the target XML configuration file and that is delivered by the EMS via the OLT after the EMS determines, by means of comparison, that the CRC check value added to the remote XML configuration file and the CRC check value added to the target XML configuration file are inconsistent.

In this embodiment of the present invention, the ONT may report a CRC check value added to a local XML configuration file of the ONT to the EMS via the OLT when power is on. When the EMS determines, by means of the comparison, that the CRC check value added to the remote XML configuration file and the CRC check value added to the target XML configuration file are inconsistent, the EMS may learn that the multicast program obtained by encapsulating the current version supported by the ONT and the multicast program obtained by encapsulating the upgrade version supported by the terminal are different. In this case, the EMS may deliver the target XML configuration file to the ONT via the OLT.

In this embodiment of the present invention, after the ONT performs the version upgrade operation according to the multicast program, the ONT may update the remote mapping relationship by using the foregoing version-address mapping relationship, and the ONT may use the foregoing version-address mapping relationship as a new remote mapping relationship.

As an optional implementation manner, in the method described in FIG. 10, after the ONT performs step 102, and before the ONT performs step 103, the ONT may further perform the following step:

the ONT determines whether a preset ONT upgrade policy is met, and if the preset ONT upgrade policy is met, performs step 103.

For example, the ONT may receive an ONT upgrade policy delivered by the OLT. The ONT upgrade policy may include one of or a combination of the following situations:

1. There is no on-demand service or voice service on the ONT;
2. A current load of the ONT is less than a preset load value;
3. Information about an upgrade version is complete;
4. The ONT finds a corresponding multicast program according to a storage address of an upgrade version;
5. There is a table of a correspondence between an upgrade version number and a multicast program;
6. No version upgrade operation is being performed on the ONT at present;
7. The ONT has sufficient memory, and a version upgrade task can be performed; or
8. The ONT has not been upgraded to an upgrade version.

As another optional implementation manner, in the method described in FIG. 10, a manner in which the ONT performs a version upgrade operation according to the multicast program in the foregoing step 105 may be specifically as follows:

the ONT extracts, from the received multicast program, an multicast packet included in the multicast program, where the multicast packet includes an upgrade target version sub-file and a control header;

the ONT combines the upgrade target version sub-file included in the multicast packet according to the control header included in the multicast packet, to obtain an upgrade target version file supported by the type of ONT; and the ONT performs the version upgrade operation according to the upgrade target version file.

The ONT may perform the version upgrade operation on the ONT in a state machine manner according to the upgrade target version file. Performing the version upgrade operation on the ONT in the state machine manner can ensure complete upgrading of a version and can further avoid repeated upgrading to a same upgrade version.

For example, in a process in which the ONT performs the version upgrade operation on the ONT in the state machine manner, the multicast server may cyclically deliver a multicast program, and when the ONT detects that upgrading fails, the ONT may perform an upgrade operation again according to the multicast program delivered at a next time by the multicast server, until the upgrade is complete; and after the ONT detects that the upgrading is complete, the ONT may instruct the multicast server to stop delivering the multicast program, which can ensure complete upgrading of a version, and can further avoid repeated upgrading to a same upgrade version.

In the method described in FIG. 10, an ONT may function as an entity for controlling an upgrade operation. In this way, an OLT may not perform upgrade operation control on the ONT, and the OLT is only used as a transmission path in a process of upgrading a version of the ONT, thereby effectively reducing a workload of the OLT. In addition, the ONT performs on-demand broadcast of a multicast program to implement version upgrading; therefore, parallel version upgrade operations can be implemented on a large quantity of ONTs, which can improve ONT upgrade efficiency.

Figure 11A:
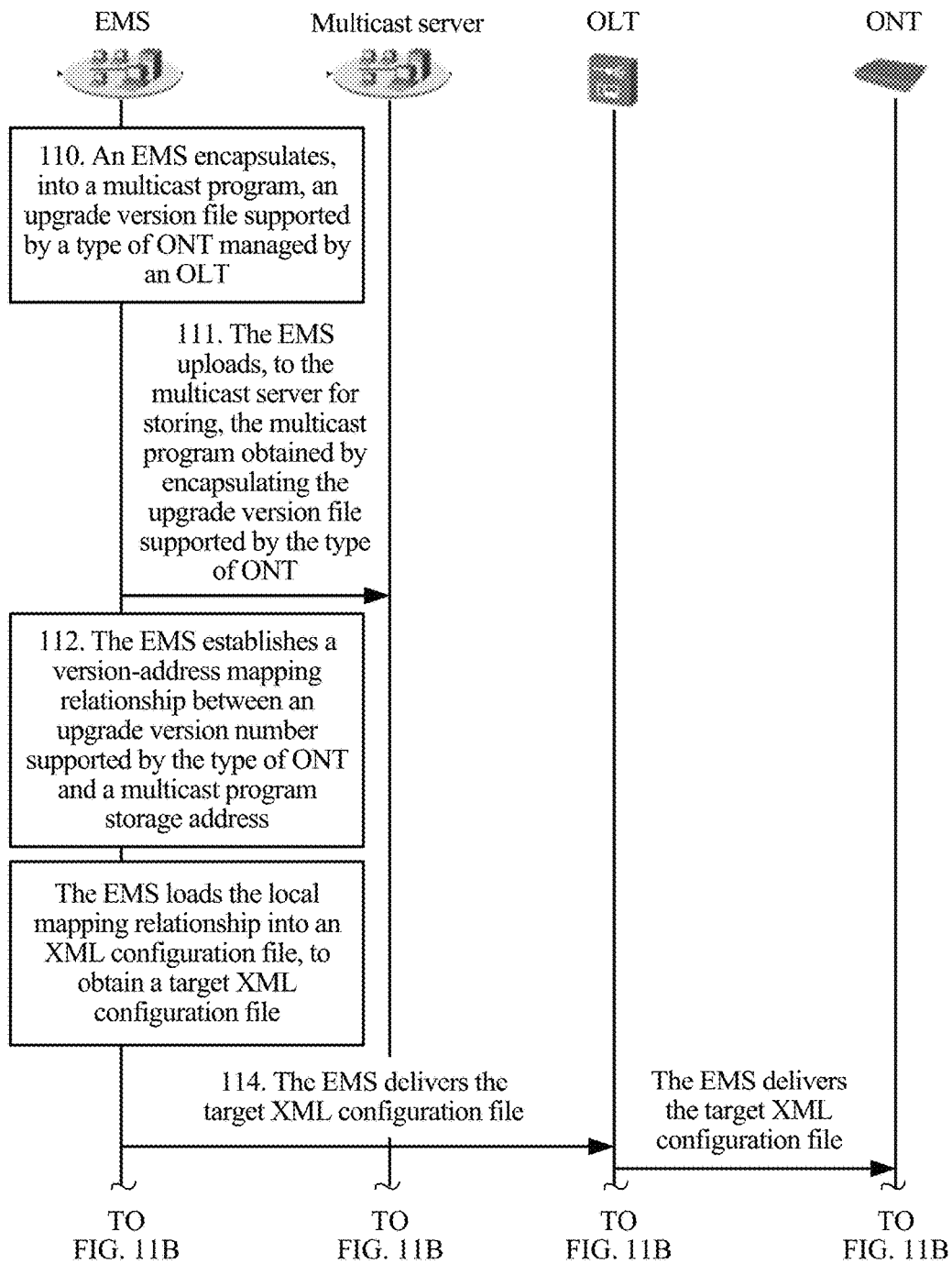
FIG. 11A and FIG. 11B are a schematic flowchart of still another terminal upgrade method disclosed in an embodiment of the present invention.
Figure 11B:
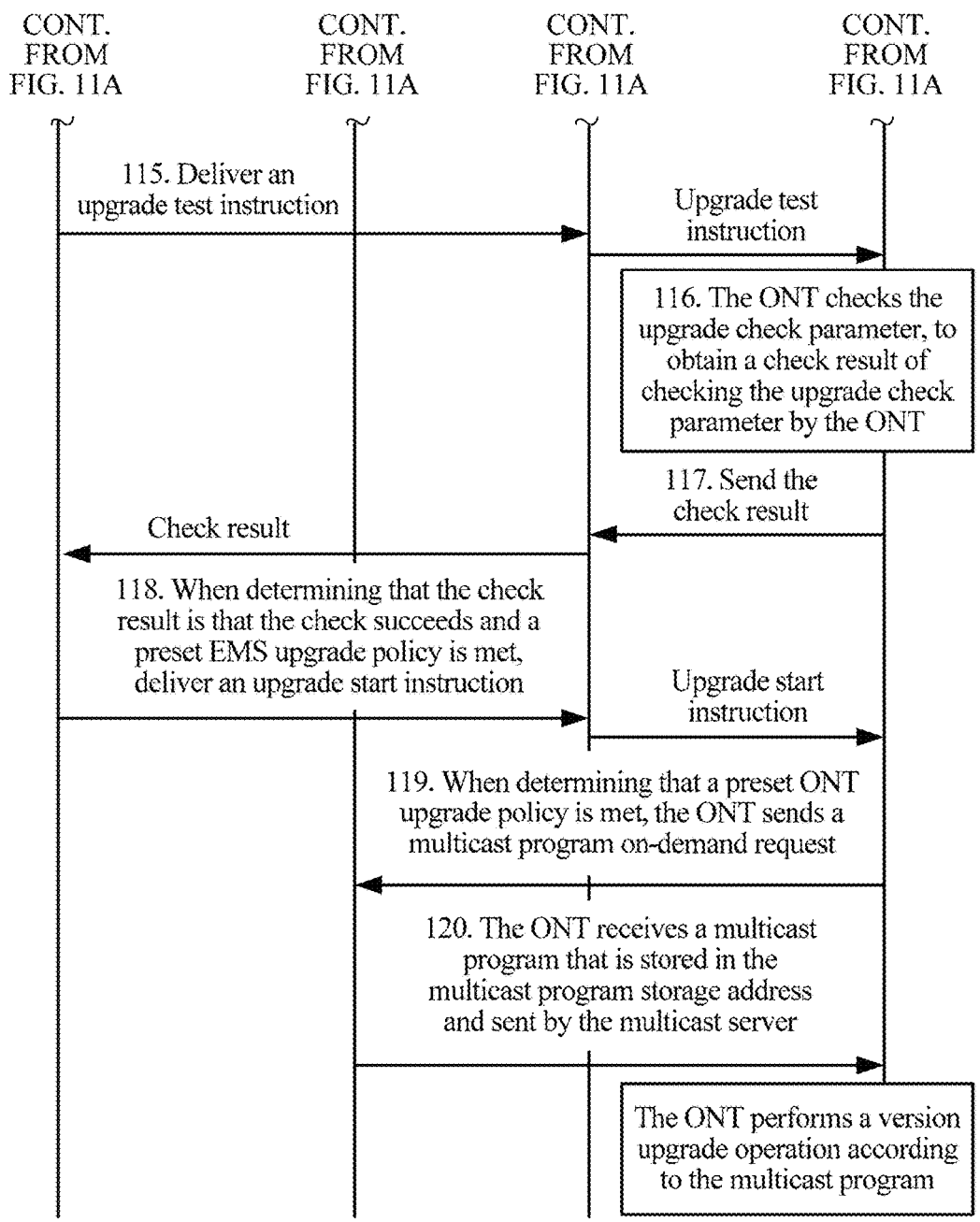

Referring to FIG. 11A and FIG. 11B, FIG. 11A and FIG. 11B are a schematic flowchart of still another optical terminal upgrade method disclosed in an embodiment of the present invention. The method described in FIG. 11A and FIG. 11B is described from multiple perspectives including an EMS, a multicast server, an OLT, and an ONT. As shown in FIG. 11A and FIG. 11B, the method may include the following steps:

110. The EMS encapsulates, as a multicast program, an upgrade version file supported by a type of ONT managed by the OLT.

111. The EMS uploads, to a multicast server for storing, the multicast program obtained by encapsulating the upgrade version file supported by the type of ONT.

112. The EMS establishes a version-address mapping relationship between an upgrade version number supported by the type of ONT and a multicast program storage address.

113. The EMS loads the local mapping relationship into an XML configuration file, to obtain a target XML configuration file.

114. The EMS delivers the target XML configuration file to the ONT via the OLT.

115. The EMS delivers an upgrade test instruction to the ONT via the OLT, where the upgrade test instruction includes an upgrade check parameter, and the upgrade check parameter includes at least a current version number and an upgrade target version number that are supported by the ONT.

116. The ONT checks the upgrade check parameter, to obtain a check result of checking the upgrade check parameter by the ONT.

117. The ONT reports the check result to the EMS via the OLT.

118. The EMS determines whether the check result is that the upgrade check parameter passes the check; and if the upgrade check parameter passes the check, the EMS determines whether a preset EMS upgrade policy is met, and if the preset EMS upgrade policy is met, delivers an upgrade start instruction to the ONT via the OLT.

119. The ONT determines whether a preset ONT upgrade policy is met, and if the preset ONT upgrade policy is met, the ONT sends, in response to the upgrade start instruction, a multicast program on-demand request to a multicast server according to the multicast program storage address in the version-address mapping relationship.

In this embodiment of the present invention, the ONT can implement adaptive control of version upgrading, which can effectively prevent the version upgrade from affecting a service used by a user (such as, a high-definition video on-demand service is not playing smoothly), and/or can effectively prevent the version upgrade from increasing a current load of the ONT, thereby preventing the ONT from breaking down.

120. The ONT receives a multicast program that is stored in the multicast program storage address and sent by the multicast server.

121. The ONT performs a version upgrade operation according to the multicast program.

In the method described in FIG. 11A and FIG. 11B, an ONT may function as an entity for controlling an upgrade operation. In this way, an OLT may not perform upgrade operation control on the ONT, and the OLT is only used as a transmission path in a process of upgrading a version of the ONT, thereby effectively reducing a workload of the OLT. In addition, the ONT performs on-demand broadcast of a multicast program to implement version upgrading; therefore, parallel version upgrade operations can be implemented on a large quantity of ONTs, which can improve ONT upgrade efficiency. An ONT can acquire, from a multicast server, a version upgrade file required for upgrading the ONT, that is, the ONT acquires the upgrade version file from the multicast server instead of an OLT. Therefore, tasks of upgrading terminals of different vendors and of different types can be performed concurrently without being limited by a processing capability of the OLT.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The terminal upgrade method, the related device, and the system provided in the embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention.

Therefore, the content of specification shall not be construed as a limit to the present invention.

What is claimed is:

1. A terminal upgrade method, comprising:

encapsulating, by an element management system (EMS), an upgrade version file supported by a type of terminal as a multicast program, and storing the multicast program in a multicast server; or sending, by the EMS, an upgrade version file supported by a type of terminal to a multicast server, to enable the multicast server to encapsulate the upgrade version file as a multicast program and to store the multicast program;

establishing, by the EMS, a version-address mapping relationship, wherein the version-address mapping relationship comprises a mapping relationship between an upgrade version number and a multicast program storage address;

delivering, by the EMS, the version-address mapping relationship to a terminal, wherein the delivering the version-address mapping relationship includes loading the version-address mapping relationship into an XML configuration file, to obtain a target XML configuration file, and delivering the target XML configuration file to the terminal; and delivering, by the EMS, an upgrade start instruction to the terminal, to trigger the terminal to send a multicast program on-demand request to the multicast server according to the multicast program storage address in the version-address mapping relationship, to enable the terminal to receive the multicast program that is stored in the multicast program storage address of the terminal and sent by the multicast server, and to enable the terminal to perform a version upgrade operation according to the received multicast program;

wherein a CRC check value is added to the target XML configuration file, and the delivering, by the EMS, the target XML configuration file to the terminal comprises:

receiving, by the EMS, a CRC check value that is added to a remote XML configuration file and reported by the terminal, wherein the remote XML configuration file is used to load a remote mapping relationship, and the remote mapping relationship is a mapping relationship between the current version number supported by the type of terminal and a storage address of a multicast program obtained by encapsulating a current version; and comparing, by the EMS, the CRC check value added to the remote XML configuration file with the CRC check value added to the target XML configuration file, and when the CRC check values are inconsistent, delivering a protocol message comprising the target XML configuration file to the terminal.

2. The method according to claim 1, wherein the encapsulating an upgrade version file supported by a type of terminal as a multicast program comprises:

dividing the upgrade version file supported by the type of terminal into at least one upgrade version sub-file;

allocating a control header to the upgrade version sub-file, wherein the control header comprises information required for upgrading the terminal; and combining the upgrade version sub-file to obtain the multicast program of the upgrade version file.

3. A terminal upgrade method, comprising:

encapsulating, by an element management system (EMS), an upgrade version file supported by a type of terminal as a multicast program, and storing the multicast program in a multicast server; or sending, by the EMS, an upgrade version file supported by a type of terminal to a multicast server, to enable the multicast server to encapsulate the upgrade version file as a multicast program and to store the multicast program;

establishing, by the EMS, a version-address mapping relationship, wherein the version-address mapping relationship comprises a mapping relationship between an upgrade version number and a multicast program storage address;

delivering, by the EMS, the version-address mapping relationship to a terminal, wherein the delivering the version-address mapping relationship includes loading the version-address mapping relationship into an XML configuration file, to obtain a target XML configuration file, and delivering the target XML configuration file to the terminal; and delivering, by the EMS, an upgrade start instruction to the terminal, to trigger the terminal to send a multicast program on-demand request to the multicast server according to the multicast program storage address in the version-address mapping relationship, to enable the terminal to receive the multicast program that is stored in the multicast program storage address of the terminal and sent by the multicast server, and to enable the terminal to perform a version upgrade operation according to the received multicast program, wherein after the delivering, by the EMS, the target XML configuration file to the terminal and before the delivering, by the EMS, an upgrade start instruction to the terminal, the method further comprises:

delivering, by the EMS, an upgrade test instruction to the terminal, wherein the upgrade test instruction comprises an upgrade check parameter, and the upgrade check parameter comprises at least a current version number and an upgrade version number that are supported by the type of terminal;

receiving, by the EMS, a check result, reported by the terminal, of checking the upgrade check parameter by the terminal; and determining, by the EMS, whether the check result is that the upgrade check parameter passes the check, and when the upgrade check parameter passes the check, performing the delivering an upgrade start instruction to the terminal.

4. A terminal upgrade method, comprising:

receiving, by a terminal, a version-address mapping relationship delivered by an element management system (EMS), wherein the version-address mapping relationship comprises a mapping relationship between an upgrade version number and a multicast program storage address, and a multicast program stored in the multicast program storage address is a multicast program obtained by encapsulating an upgrade version file supported by a type of terminal, wherein the receiving a version-address mapping relationship delivered by an element management system (EMS) includes receiving a target XML configuration file delivered by the EMS, wherein the version-address mapping relationship is loaded into the target XML configuration file;

receiving, by the terminal, an upgrade start instruction delivered by the EMS;

sending, by the terminal in response to the upgrade start instruction, a multicast program on-demand request to a multicast server according to the multicast program storage address in the version-address mapping relationship;

receiving, by the terminal, the multicast program that is stored in the multicast program storage address and sent by the multicast server; and performing, by the terminal, a version upgrade operation according to the received multicast program;

wherein a CRC check value is added to the target XML configuration file, and the receiving, by the terminal, a target XML configuration file delivered by the EMS comprises:

reporting, by the terminal, a CRC check value added to a remote XML configuration file to the EMS, wherein the remote XML configuration file is used to load a remote mapping relationship, and the remote mapping relationship is a mapping relationship between the current version number supported by the type of terminal and a storage address of a multicast program obtained by encapsulating a current version; and receiving, by the terminal, a protocol message that comprises the target XML configuration file and that is delivered by the EMS after the EMS determines, by means of comparison, that the CRC check value added to the remote XML configuration file and the CRC check value added to the target XML configuration file are inconsistent.

5. The method according to claim 4, wherein the performing, by the terminal, a version upgrade operation according to the received multicast program comprises:

extracting, by the terminal, an upgrade version sub-file from the received multicast program, wherein the upgrade version sub-file comprises a control header, and the control header comprises information required for upgrading the terminal;

combining, by the terminal, the upgrade version sub-file according to the control header comprised in the upgrade version sub-file, to obtain the upgrade version file supported by the type of terminal; and performing, by the terminal, the version upgrade operation according to the upgrade version file.

6. A terminal upgrade method, comprising:

receiving, by a terminal, a version-address mapping relationship delivered by an element management system (EMS), wherein the version-address mapping relationship comprises a mapping relationship between an upgrade version number and a multicast program storage address, and a multicast program stored in the multicast program storage address is a multicast program obtained by encapsulating an upgrade version file supported by a type of terminal, wherein the receiving a version-address mapping relationship delivered by an element management system (EMS) includes receiving a target XML configuration file delivered by the EMS, wherein the version-address mapping relationship is loaded into the target XML configuration file;

receiving, by the terminal, an upgrade start instruction delivered by the EMS;

sending, by the terminal in response to the upgrade start instruction, a multicast program on-demand request to a multicast server according to the multicast program storage address in the version-address mapping relationship;

receiving, by the terminal, the multicast program that is stored in the multicast program storage address and sent by the multicast server; and performing, by the terminal, a version upgrade operation according to the received multicast program, wherein after the receiving, by the terminal, a target XML configuration file delivered by the EMS and before the receiving, by the terminal, an upgrade start instruction delivered by the EMS, the method further comprises:

receiving, by the terminal, an upgrade test instruction delivered by the EMS, wherein the upgrade test instruction comprises an upgrade check parameter, and the upgrade check parameter comprises at least a current version number and an upgrade version number that are supported by the type of terminal;

checking, by the terminal, the upgrade check parameter, to obtain a check result of checking the upgrade check parameter by the terminal; and reporting, by the terminal, the check result to the EMS, to trigger the EMS to deliver the upgrade start instruction to the terminal when the EMS determines that the check result is that the upgrade check parameter passes the check.

7. A terminal upgrade method, comprising:

receiving, by a terminal, a version-address mapping relationship delivered by an element management system (EMS), wherein the version-address mapping relationship comprises a mapping relationship between an upgrade version number and a multicast program storage address, and a multicast program stored in the multicast program storage address is a multicast program obtained by encapsulating an upgrade version file supported by a type of terminal;

receiving, by the terminal, an upgrade start instruction delivered by the EMS;

sending, by the terminal in response to the upgrade start instruction, a multicast program on-demand request to a multicast server according to the multicast program storage address in the version-address mapping relationship;

receiving, by the terminal, the multicast program that is stored in the multicast program storage address and sent by the multicast server; and performing, by the terminal, a version upgrade operation according to the received multicast program, wherein after the receiving, by the terminal, an upgrade start instruction delivered by the EMS, and before the sending, by the terminal in response to the upgrade start instruction, a multicast program on-demand request to a multicast server according to the multicast program storage address in the version-address mapping relationship, the method further comprises:

determining, by the terminal, whether a terminal upgrade policy is met, and when the terminal upgrade policy is met, performing the sending, in response to the upgrade start instruction, a multicast program on-demand request to a multicast server according to the multicast program storage address in the version-address mapping relationship, wherein the terminal upgrade policy comprises any one of or a combination of the following: there is no on-demand service or voice service on the terminal, or a current load of the terminal is less than a preset load value.

8. An element management system, comprising a receiver, a processor, a memory, and a transmitter, wherein the receiver, the processor, the memory, and the transmitter are separately connected to a bus, the memory stores a group of terminal upgrade program code, and the processor is configured to invoke the terminal upgrade program code stored in the memory, so as to:

receive, using the receiver, an upgrade version file supported by a type of terminal;

encapsulate the upgrade version file supported by the type of terminal as a multicast program, and transmit, using the transmitter, the multicast program to a multicast server for storing;

or send, using the transmitter, the upgrade version file supported by the type of terminal to a multicast server, to enable the multicast server to encapsulate the upgrade version file as a multicast program and to store the multicast program;

establish a version-address mapping relationship, wherein the version-address mapping relationship comprises a mapping relationship between an upgrade version number and a multicast program storage address;

load the version-address mapping relationship into an XML configuration file, to obtain a target XML configuration file;

deliver the target XML configuration file to the terminal using the transmitter; and deliver an upgrade start instruction to the terminal using the transmitter, to trigger the terminal to send a multicast program on-demand request to the multicast server according to the multicast program storage address in the version-address mapping relationship, to enable the terminal to receive the multicast program that is stored in the multicast program storage address of the terminal and sent by the multicast server, and to perform a version upgrade operation according to the received multicast program;

wherein a CRC check value is added to the target XML configuration file, and the processor is configured to:

receive, using the receiver, a CRC check value that is added to a remote XML configuration file and reported by the terminal, wherein the remote XML configuration file is used to load a remote mapping relationship, and the remote mapping relationship is a mapping relationship between the current version number supported by the type of terminal and a storage address of a multicast program obtained by encapsulating a current version; and compare the CRC check value added to the remote XML configuration file with the CRC check value added to the target XML configuration file, and when the CRC check values are inconsistent, deliver a protocol message comprising the target XML configuration file to the terminal by using the transmitter.

9. The element management system according to claim 8, wherein the processor is configured to:

divide the upgrade version file supported by the type of terminal into at least one upgrade version sub-file;

allocate a control header to the upgrade version sub-file, wherein the control header comprises information required for upgrading the terminal; and combine the upgrade version sub-file to obtain the multicast program of the upgrade version file.

10. An element management system, comprising a receiver, a processor, a memory, and a transmitter, wherein the receiver, the processor, the memory, and the transmitter are separately connected to a bus, the memory stores a group of terminal upgrade program code, and the processor is configured to invoke the terminal upgrade program code stored in the memory, so as to:

receive, using the receiver, an upgrade version file supported by a type of terminal;

encapsulate the upgrade version file supported by the type of terminal as a multicast program, and transmit, using the transmitter, the multicast program to a multicast server for storing; or send, using the transmitter, the upgrade version file supported by the type of terminal to a multicast server, to enable the multicast server to encapsulate the upgrade version file as a multicast program and to store the multicast program;

establish a version-address mapping relationship, wherein the version-address mapping relationship comprises a mapping relationship between an upgrade version number and a multicast program storage address;

load the version-address mapping relationship into an XML configuration file, to obtain a target XML configuration file;

deliver the target XML configuration file to the terminal using the transmitter; and deliver an upgrade start instruction to the terminal using the transmitter, to trigger the terminal to send a multicast program on-demand request to the multicast server according to the multicast program storage address in the version-address mapping relationship, to enable the terminal to receive the multicast program that is stored in the multicast program storage address of the terminal and sent by the multicast server, and to perform a version upgrade operation according to the received multicast program, wherein after the delivering, by the processor, the target XML configuration file to the terminal using the transmitter and before the delivering, by the processor, an upgrade start instruction to the terminal using the transmitter, the processor is further configured to:

deliver an upgrade test instruction to the terminal using the transmitter, wherein the upgrade test instruction comprises an upgrade check parameter, and the upgrade check parameter comprises at least a current version number and an upgrade version number that are supported by the type of terminal;

receive, using the receiver, a check result, reported by the terminal, of checking the upgrade check parameter by the terminal; and determine whether the check result is that the upgrade check parameter passes the check, and when the upgrade check parameter passes the check, perform the operation of delivering an upgrade start instruction to the terminal by using the transmitter.

11. A terminal, comprising a receiver, a processor, a memory, and a transmitter, wherein the receiver, the processor, the memory, and the transmitter are separately connected to a bus, the memory stores a group of terminal upgrade program code, and the processor is configured to invoke the terminal upgrade program code stored in the memory, so as to:

receive, using the receiver, a target XML configuration file delivered by an element management system (EMS), wherein a version-address mapping relationship is loaded into the target XML configuration file, and wherein the version-address mapping relationship comprises a mapping relationship between an upgrade version number and a multicast program storage address, and a multicast program stored in the multicast program storage address is a multicast program obtained by encapsulating an upgrade version file supported by a type of terminal;

receive, using the receiver, an upgrade start instruction delivered by the EMS;
send, in response to the upgrade start instruction, a multicast program on-demand request to a multicast server according to the multicast program storage address in the version-address mapping relationship by using the transmitter;
receive, using the receiver, the multicast program that is stored in the multicast program storage address and sent by the multicast server; and
perform a version upgrade operation according to the received multicast program;
wherein after the receiving, by the processor using the receiver, a target XML configuration file delivered by the EMS, and before the receiving, by the processor using the receiver, an upgrade start instruction delivered by the EMS, the processor is further configured to:
receive, using the receiver, an upgrade test instruction delivered by the EMS, wherein the upgrade test instruction comprises an upgrade check parameter, and the upgrade check parameter comprises at least a current version number and an upgrade version number that are supported by the type of terminal;
check the upgrade check parameter to obtain a check result of checking the upgrade check parameter by the terminal; and
report the check result to the EMS using the transmitter, to trigger the EMS to deliver the upgrade start instruction to the terminal when the EMS determines that the check result is that the upgrade check parameter passes the check.

12. The terminal according to claim 11, wherein the processor is configured to:
extract an upgrade version sub-file from the received multicast program, wherein the upgrade version sub-file comprises a control header, and the control header comprises information required for upgrading the terminal;
combine the upgrade version sub-file according to the control header comprised in the upgrade version sub-file, to obtain the upgrade version file supported by the type of terminal; and
perform the version upgrade operation according to the upgrade version file.

\* \* \* \* \*